(12) United States Patent
Huang et al.

(10) Patent No.: US 10,981,276 B2
(45) Date of Patent: Apr. 20, 2021

(54) TOOL CALIBRATION APPARATUS FOR ROBOTIC ARM

(71) Applicant: DELTA ELECTRONICS, INC., Taoyuan (TW)

(72) Inventors: Cheng-Hao Huang, Taoyuan (TW); Chih-Ming Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 229 days.

(21) Appl. No.: 16/212,273

(22) Filed: Dec. 6, 2018

(65) Prior Publication Data

US 2019/0381668 A1    Dec. 19, 2019

(30) Foreign Application Priority Data

Jun. 19, 2018    (CN) .......................... 201810631456.6

(51) Int. Cl.
*B25J 9/16*    (2006.01)
*B25J 19/02*    (2006.01)

(52) U.S. Cl.
CPC ............. *B25J 9/1692* (2013.01); *B25J 19/02* (2013.01)

(58) Field of Classification Search
CPC . B25J 9/02; B25J 9/1692; G05B 2219/39201; G05B 2219/39024
See application file for complete search history.

(56) References Cited

U.S. PATENT DOCUMENTS

| 2016/0368147 | A1* | 12/2016 | Li | B25J 9/1692 |
| 2017/0151670 | A1* | 6/2017 | Huang | B25J 9/1692 |
| 2018/0373232 | A1* | 12/2018 | Hedlund | G05B 19/423 |

* cited by examiner

*Primary Examiner* — Jeff A Burke
*Assistant Examiner* — Zachary Joseph Wallace
(74) *Attorney, Agent, or Firm* — Kirton McConkie; Evan R. Witt

(57) ABSTRACT

A tool calibration apparatus includes a first measuring device, a second measuring device, a third measuring device, a fourth measuring device and a fifth measuring device. The first measuring device includes a first measuring surface, a first measuring edge and a sensor. The second measuring device includes a second measuring surface, a second measuring edge and a sensor. The third measuring device includes a third measuring edge and a sensor. The fourth measuring device includes a fourth measuring edge and a sensor. The fifth measuring device includes a third measuring surface and a sensor. The first measuring surface, the first measuring edge and the third measuring edge are movable in an X-axis direction. The second measuring surface, the second measuring edge and the fourth measuring edge are movable in a Y-axis direction. The third measuring surface is movable in a Z-axis direction.

16 Claims, 10 Drawing Sheets

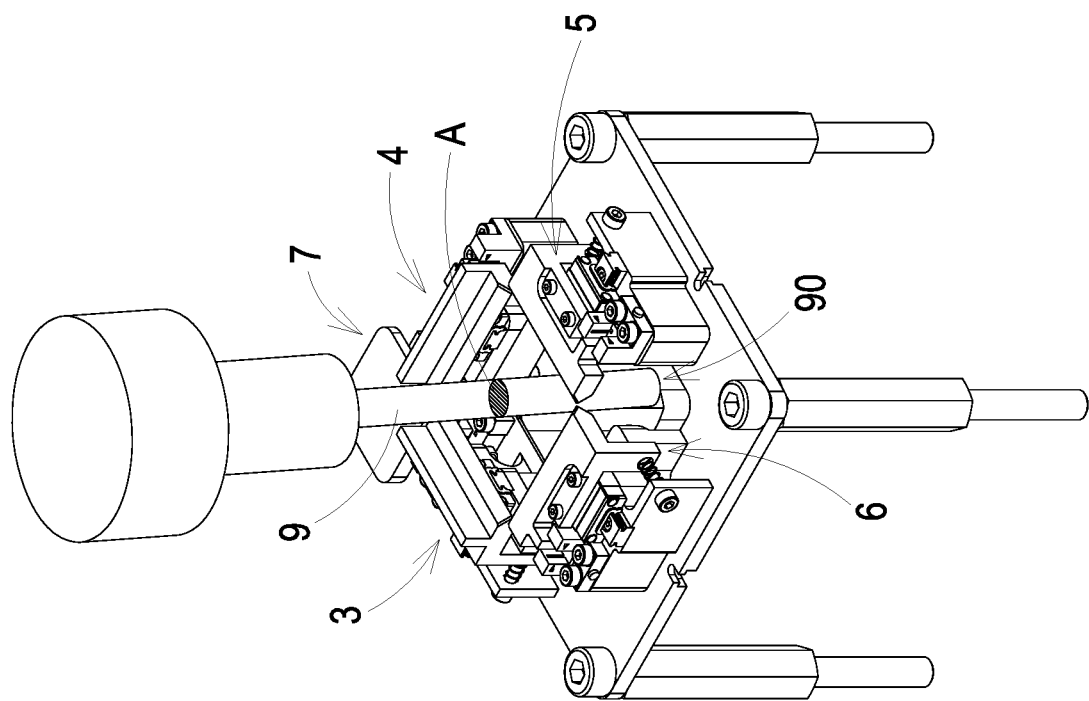

TOOL CALIBRATION APPARATUS FOR ROBOTIC ARM

FIELD OF THE INVENTION

The present disclosure relates to a tool calibration apparatus, and more particularly to a tool calibration apparatus for a robotic arm.

BACKGROUND OF THE INVENTION

With the advancement of industrial technology, a wide variety of robots have been extensively developed for use in lives and industries. Generally, a robotic arm is an important component of the robot, and a tool is assembled with an end of the robotic arm to perform the required tasks. For example, the tool may be a welding tool, a drilling tool, a gripping tool, an abrading tool or a cutting tool. The tool fixed on the end of the robotic arm needs to have a distal end, which is referred as a tool center point (TCP). When the tool is installed on the end of the robotic arm, the relative offset between the TCP of the tool and the end-effect position point of the robotic arm has to be accurately acquired and previously set. Consequently, when the tool is installed on the robotic arm, a robot program is executed to perform a calibrating operation according to the acquired offset amount. In such way, the tool can be operated on the correct path and position.

Nowadays, a tool calibration apparatus is used to calibrate the TCP of the tool. The principles of the calibration process of the conventional tool calibration apparatus will be described as follows. When the tool is installed on the distal end of the robotic arm, the tool is moved toward the tool calibration apparatus. Moreover, a contact point simulation process and a teaching procedure of the tool are performed. That is, the robotic arm drives the movement of the tool within the space of a frame of the tool calibration apparatus. Moreover, according to the movement of the TCP of the tool, the tool calibration apparatus performs a contact point teaching process and create a sample of the tool. In such way, when the tool is replaced with the same type of tool, the tool calibration apparatus compares the offset amount before the replacement with the offset amount after the replacement. After the robotic arm compensates the accuracy of the tool, the tool calibration process is completed.

However, the conventional tool calibration apparatus still has some drawbacks. For example, since the conventional tool calibration apparatus uses infrared sensors to perform the sensing tasks, the fabricating cost of the conventional tool calibration apparatus is high. In some situations or according to some requirements, the robotic arm has to drive movement of the tool on the correct path and position more precisely. In addition to the calibration of the TCP of the tool, it is necessary to realize the axis direction of the tool and the dimension of the tool in advance. Since the conventional tool calibration apparatus does not have the functions of detecting the axis direction of the tool and the dimension of the tool, an additional device or detecting method is used to detect the axis direction of the tool and the dimension of the tool. Under this circumstance, the applications of the conventional tool calibration apparatus are limited, and the positioning precision and the direction precision of the tool cannot be effectively enhanced.

Therefore, there is a need of providing a tool calibration apparatus for a robotic arm so as to overcome the drawbacks of the conventional technologies.

SUMMARY OF THE INVENTION

The present disclosure provides a tool calibration apparatus for a robotic arm. Since the tool calibration apparatus is not equipped with the infrared sensor, the fabricating cost is reduced. In addition, the tool calibration apparatus can be modularized. By the tool calibration apparatus, the relative offset between the TCP of the tool and the end-effect position point of the robotic arm can be accurately measured and acquired. Consequently, the robotic arm can quickly and precisely compensate the accuracy of the tool. In other words, the tool can be accurately operated. Moreover, the controller of the tool calibration apparatus is capable of accurately calculating the axis direction information of the tool, the dimension of the tool and the rotation angle of the tool. In comparison with the manual calibration method, the tool calibration apparatus of the present disclosure is time-saving while achieving high precise calibration and increasing the applications.

In accordance with an aspect of the present disclosure, there is provided a tool calibration apparatus for a robotic arm with a tool. The robotic arm is controlled by a controller. The controller records a position point of the robotic arm and in in communication with the tool calibration apparatus. The tool calibration apparatus includes a base, a first measuring device, a second measuring device, a third measuring device, a fourth measuring device and a fifth measuring device. The first measuring device is disposed on the base, and includes a first measuring surface, a first sensor and a first measuring edge. The first measuring surface and the first measuring edge are movable in an X-axis direction. When a tool center point of the tool is contacted with the first measuring surface to drive a movement of the first measuring surface and trigger the first sensor, the first sensor generates a first feedback signal to the controller, and the controller records the position point of the robotic arm according to the first feedback signal. When any region of the tool is contacted with the first measuring edge to drive a movement of the first measuring edge and trigger the first sensor, the first sensor generates the first feedback signal to the controller, and the controller records the position point of the robotic arm according to the first feedback signal. The second measuring device is disposed on the base, and includes a second measuring surface, a second sensor and a second measuring edge. The second measuring surface and the second measuring edge are movable in a Y-axis direction. When the tool center point of the tool is contacted with the second measuring surface to drive a movement of the second measuring surface and trigger the second sensor, the second sensor generates a second feedback signal to the controller, and the controller records the position point of the robotic arm according to the second feedback signal. When any region of the tool is contacted with the second measuring edge to drive a movement of the second measuring edge and trigger the second sensor, the second sensor generates the second feedback signal to the controller, and the controller records the position point of the robotic arm according to the second feedback signal. The third measuring device is disposed on the base and opposed to the first measuring device, and includes a third sensor and a third measuring edge. The third measuring edge is movable in the X-axis direction. When any region of the tool is contacted with the third measuring edge to drive a movement of the third measuring edge and trigger the third sensor, the third sensor generates a third feedback signal to the controller, and the controller records the position point of the robotic arm according to the third feedback signal. The fourth measuring device is disposed on the base and opposed to the second measuring device, and includes a fourth sensor and a fourth measuring edge. The fourth measuring edge is movable in the Y-axis direction. When any region of the tool is contacted with the fourth measuring edge to drive a movement of the fourth measuring edge and trigger the fourth sensor, the fourth sensor generates a fourth feedback signal to the controller, and the controller records the position point of the robotic arm according to the fourth feedback signal. The fifth measuring device is disposed on the base, and includes a fifth sensor and a third measuring surface. The third measuring surface is movable in a Z-axis direction. When the tool center point of the tool is contacted with the third measuring surface to drive a movement of the third measuring surface and trigger the fifth sensor, the fifth sensor generates a fifth feedback signal to the controller, and the controller records the position point of the robotic arm according to the fifth feedback signal. The tool drives at least one of the first measuring device, the second measuring device, the third measuring device, the fourth measuring device and the fifth measuring device to generate at least one of the first feedback signal, the second feedback signal, the third feedback signal, the fourth feedback signal and the fifth feedback signal to the controller, so that a required information of the tool is acquired according the position point of robotic arm recorded by the controller.

In accordance with another aspect of the present disclosure, a tool calibration apparatus for a robotic arm with a tool is provided. The robotic arm is controlled by a controller. The controller records a position point of the robotic arm and is in communication with the tool calibration apparatus. The tool calibration apparatus includes a base, a first measuring device, a second measuring device and a third measuring device. The first measuring device is disposed on the base, and includes a first measuring surface, a first sensor and a first measuring edge. The first measuring surface and the first measuring edge are movable in an X-axis direction. When a tool center point of the tool is contacted with the first measuring surface to drive a movement of the first measuring surface and trigger the first sensor, the first sensor generates a first feedback signal to the controller, and the controller records the position point of the robotic arm according to the first feedback signal. When any region of the tool is contacted with the first measuring edge to drive a movement of the first measuring edge and trigger the first sensor, the first sensor generates the first feedback signal to the controller, and the controller records the position point of the robotic arm according to the first feedback signal. The second measuring device is disposed on the base, and includes a second measuring surface, a second sensor and a second measuring edge. The second measuring surface and the second measuring edge are movable in a Y-axis direction. When the tool center point of the tool is contacted with the second measuring surface to drive a movement of the second measuring surface and trigger the second sensor, the second sensor generates a second feedback signal to the controller, and the controller records the position point of the robotic arm according to the second feedback signal. When any region of the tool is contacted with the second measuring edge to drive a movement of the second measuring edge and trigger the second sensor, the second sensor generates the second feedback signal to the controller, and the controller records the position point of the robotic arm according to the second feedback signal. The third measuring device is disposed on the base, and includes a third sensor and a third measuring surface. The third measuring surface is movable in a Z-axis direction. When the tool center point of the tool is contacted with the third measuring surface to drive a movement of the third measuring surface and trigger the third sensor, the third sensor generates a third feedback signal to the controller, and the controller records the position point of the robotic arm according to the third feedback signal. The tool drives at least one of the first measuring device, the second measuring device and the third measuring device to generate at least one of the first feedback signal, the second feedback signal and the third feedback signal to the controller, so that a required information of the tool is acquired according the position point of robotic arm recorded by the controller.

The above contents of the present disclosure will become more readily apparent to those ordinarily skilled in the art after reviewing the following detailed description and accompanying drawings, in which:

BRIEF DESCRIPTION OF THE DRAWINGS

FIG. 4A schematically illustrates the operating state of the tool to be calibrated when the tool is in a first measuring altitude;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
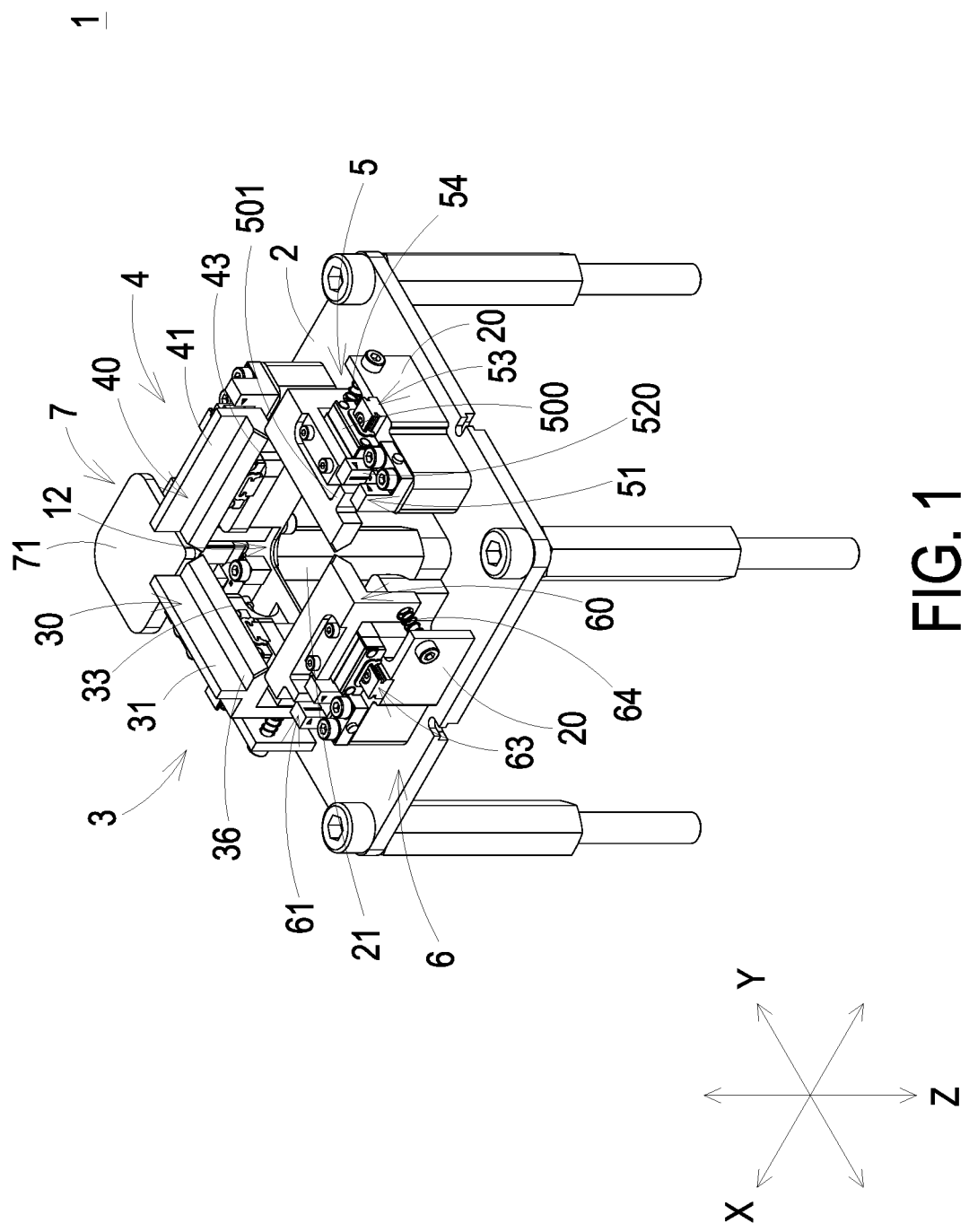
FIG. 1 is a schematic perspective view illustrating a tool calibration apparatus according to a first embodiment of the present disclosure.
Figure 2:
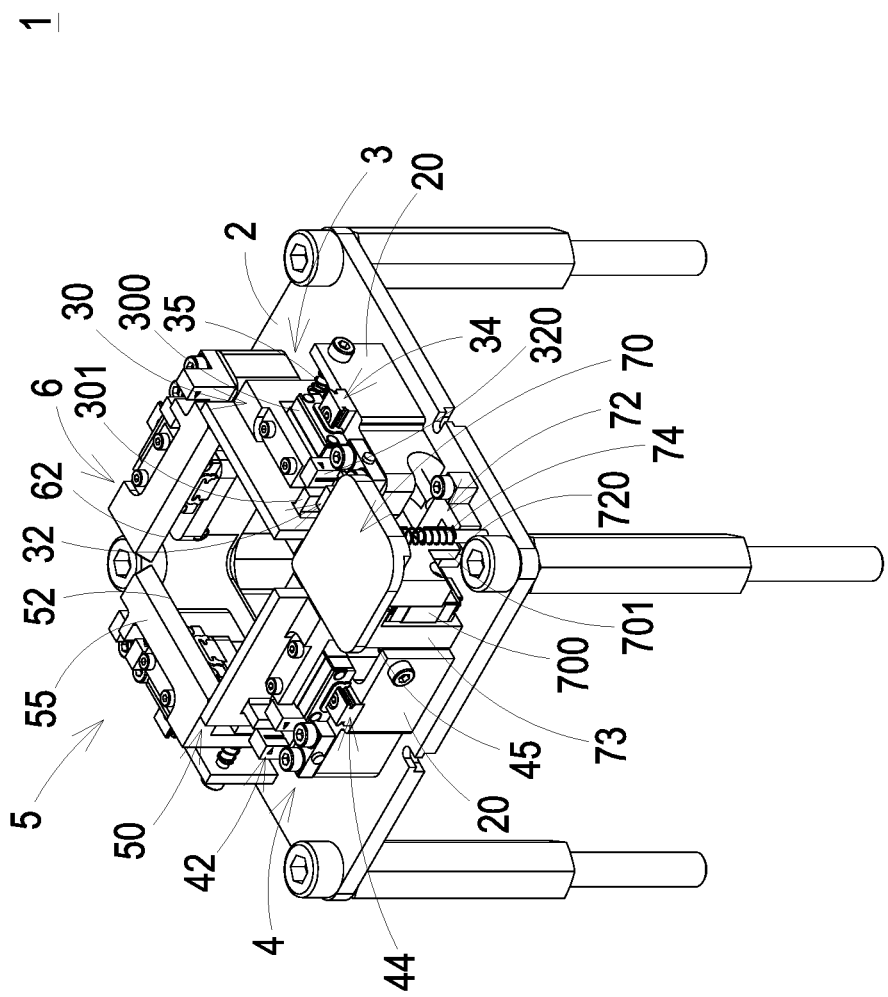
FIG. 2 is a schematic perspective view illustrating the tool calibration apparatus of FIG. 1 and taken along another viewpoint.
Figure 3:
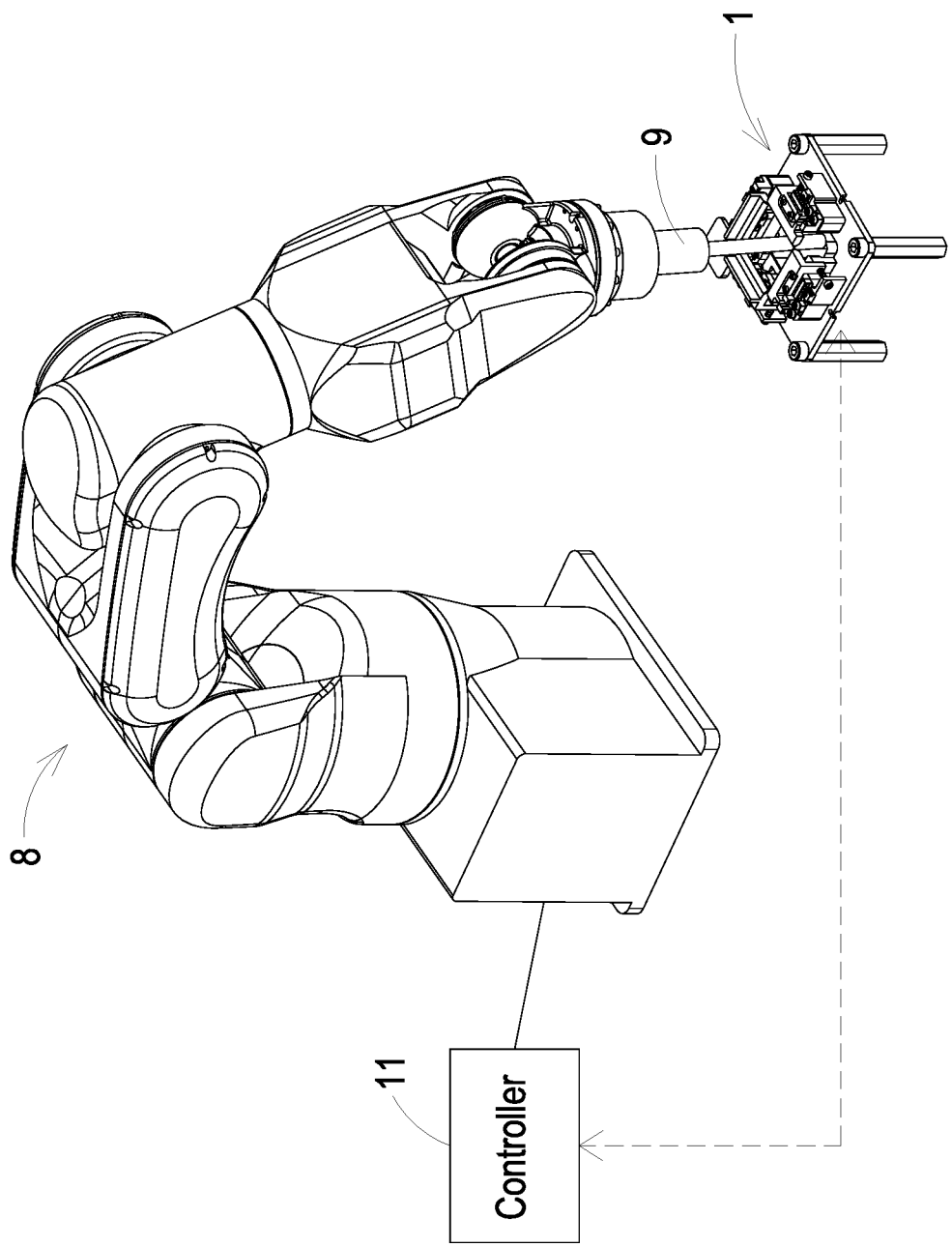
FIG. 3 is a schematic perspective view illustrating the application of the tool calibration apparatus of FIG. 1 on a robotic arm with a tool.
Figure 4B:
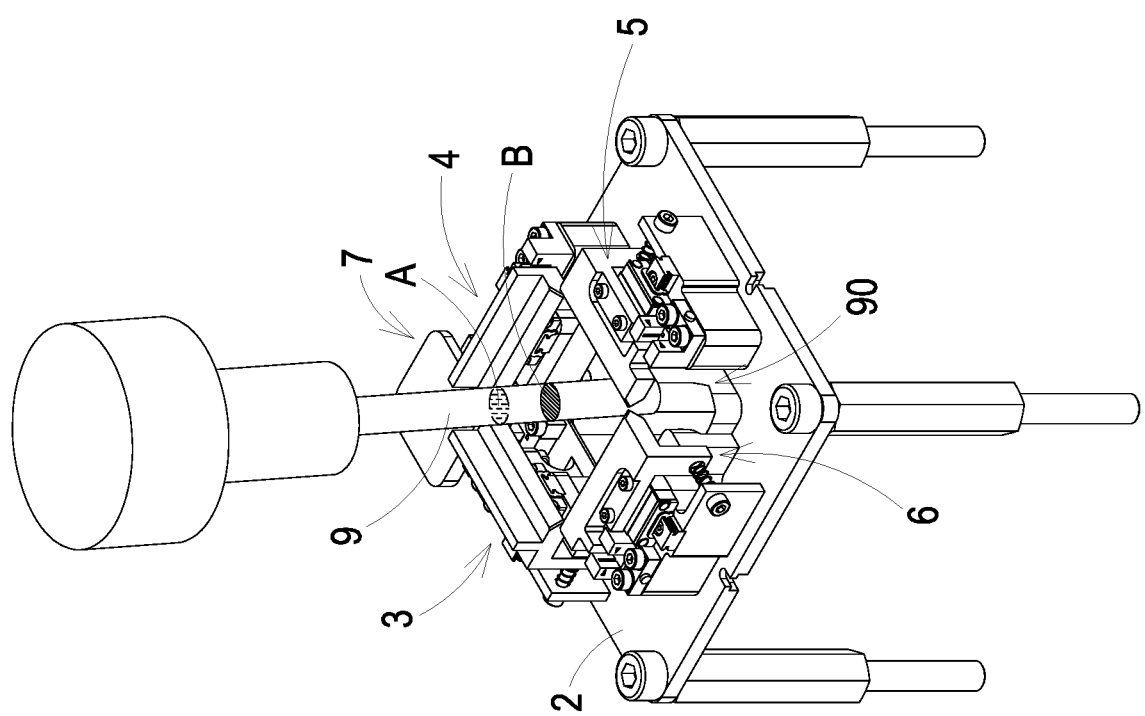
FIG. 4B schematically illustrates the operating state of the tool to be calibrated when the tool is in a second measuring altitude.

Please refer to FIGS. 1, 2, 3, 4A and 4B. FIG. 1 is a schematic perspective view illustrating a tool calibration apparatus according to a first embodiment of the present disclosure. FIG. 2 is a schematic perspective view illustrating the tool calibration apparatus of FIG. 1 and taken along another viewpoint. FIG. 3 is a schematic perspective view illustrating the application of the tool calibration apparatus of FIG. 1 on a robotic arm with a tool. FIG. 4A schematically illustrates the operating state of the tool to be calibrated when the tool is in a first measuring altitude. FIG. 4B schematically illustrates the operating state of the tool to be calibrated when the tool is in a second measuring altitude.

The tool calibration apparatus 1 is used for calibrating a tool 9, which is installed on an end of a robotic arm 8. Consequently, when the robotic arm 8 executes a required task, the tool 9 can be operated at the accurate position. Preferably but not exclusively, the robotic arm 8 is a six-axis robotic manipulator or a selective compliance assembly robot arm (SCARA). The actions of the robotic arm 8 are controlled by a controller 11. Moreover, the controller 11 can record the moved position point of the robotic arm 8. The robotic arm 8 can drive the movement of the tool 9 in the X-axis direction, the Y-axis direction or the Z-axis direction. Moreover, the robotic arm 8 can drive the rotation of the tool 9. Consequently, the axis line direction of the tool 9 is changed and/or the rotating angle of the tool 9 is changed. Moreover, the controller 11 is in communication with the tool calibration apparatus 1 in a wired transmission manner or a wireless transmission manner.

The tool calibration apparatus 1 includes a base 2, a first measuring device 3, a second measuring device 4, a third measuring device 5, a fourth measuring device 6 and a fifth measuring device 7. The base 2 includes plural pushing parts 20 disposed on a top surface of the base 2. As shown in FIGS. 1 and 2, the base 2 includes four pushing parts 20. The four pushing parts 20 are arranged near the first measuring device 3, the second measuring device 4, the third measuring device 5 and the fourth measuring device 6, respectively.

The first measuring device 3, the second measuring device 4, the third measuring device 5, the fourth measuring device 6 and the fifth measuring device 7 are disposed on the base 2. A first side of the first measuring device 3 is arranged beside a first side of the second measuring device 4. A second side of the first measuring device 3 is arranged beside a first side of the fourth measuring device 6. A second side of the second measuring device 4 is arranged beside a first side of the third measuring device 5. A second side of the third measuring device 5 is arranged beside a second side of the fourth measuring device 6. Moreover, the first measuring device 3 and the third measuring device 5 are opposed to each other, and the second measuring device 4 and the fourth measuring device 6 are opposed to each other. Consequently, the first measuring device 3, the second measuring device 4, the third measuring device 5 and the fourth measuring device 6 are disposed on the base 2 in a rectangular arrangement. Moreover, a sensing space 12 is formed between the first measuring device 3, the second measuring device 4, the third measuring device 5 and the fourth measuring device 6. The tool 9 is movable relative to the base 2. For example, the tool 9 can be moved within the sensing space 12, or the tool 9 can be moved in the space outside the sensing space 12.

The first measuring device 3 includes a first main body 30, a first measuring surface 31, a first sensor 32, a first measuring edge 33, a first linear track 34 and a first elastic element 35. The first sensor 32 and the first elastic element 35 are arranged near two opposite sides of the first linear track 34. The first sensor 32 is in communication with the controller 11 in the wired transmission manner or the wireless transmission manner. When the first sensor 32 is triggered, a first feedback signal is transmitted from the first sensor 32 to the controller 11. According to the first feedback signal, the controller 11 records the current position point of the robotic arm 8. The first main body 30 is movable in the X-axis direction. The first main body 30 comprises a sliding part 300 and a measuring part 301. The measuring part 301 is aligned with the first sensor 32. While the first measuring surface 31 drives the movement of the first main body 30 in the X-axis direction, the measuring part 301 is correspondingly moved in the X-axis direction. When the measuring part 301 is moved to the position of the first sensor 32, the first sensor 32 is triggered by the measuring part 301. Consequently, the controller 11 records the current position point of the robotic arm 8 (i.e., a first current position point). While the first measuring edge 33 drives the movement of the first main body 30 in the X-axis direction, the measuring part 301 is correspondingly moved in the X-axis direction. When the measuring part 301 is moved to the position of the first sensor 32, the first sensor 32 is triggered by the measuring part 301. Consequently, the controller 11 records the current position point of the robotic arm 8 (i.e., a second current position point). The first sensor 32 comprises a sensing recess 320 corresponding to the measuring part 301. When the measuring part 301 is moved to the sensing recess 320, the first sensor 32 is triggered. Preferably but not exclusively, the first sensor 32 is a position sensor or a contact switch. The first linear track 34 is fixed on the corresponding pushing part 20 of the base 2. Moreover, the sliding part 300 matches the first linear track 34. Consequently, the first main body 30 can be slid relative to the first linear track 34. The first measuring surface 31 is perpendicularly protruded from a top surface of the first main body 30. Moreover, the first main body 30 is moved with the first measuring surface 31 in the X-axis direction. The first measuring edge 33 is a shape edge of a sharp-shaped block 36 of the first main body 30. The sharp-shaped block 36 is horizontally protruded from the first main body 30 and tapered in the direction toward the sensing space 12. Consequently, the shape edge of the sharp-shaped block 36 is created. Moreover, the first main body 30 is moved with the first measuring edge 33 in the X-axis direction. The first elastic element 35 is arranged between the first main body 30 and the corresponding pushing part 20. A first end of the first elastic element 35 is contacted with the corresponding pushing part 20. A second end of the first elastic element 35 is contacted with the first main body 30. When an external force from the first main body 30 is exerted on the first elastic element 35, the first elastic element 35 is compressed to generate an elastic restoring force. When the external force is no longer exerted on the first elastic element 35, the first main body 30 is returned to its initial position in response to the elastic restoring force of the first elastic element 35.

The second measuring device 4 comprises a second main body 40, a second measuring surface 41, a second sensor 42, a second measuring edge 43, a second linear track 44 and a second elastic element 45. The structures, constituents and actions of the second main body 40, the second measuring surface 41, the second sensor 42, the second measuring edge 43, the second linear track 44 and the second elastic element 45 are similar to the first main body 30, the first measuring surface 31, the first sensor 32, the first measuring edge 33, the first linear track 34 and the first elastic element 35 of the first measuring device 3, and are not redundantly described herein. Whereas, the second main body 40 of the second measuring device 4 is movable in the Y-axis direction. Consequently, the second measuring surface 41 and the second measuring edge 43 are moved with the second main body 40 in the Y-axis direction. While the second measuring surface 41 drives the movement of the second main body 40 to trigger the second sensor 42, a second feedback signal is transmitted from the second sensor 42 to the controller 11. According to the second feedback signal, the controller 11 records the current position point of the robotic arm 8 (i.e., a third current position point). While the second measuring edge 43 drives the movement of the second main body 40 to trigger the second sensor 42, the second feedback signal is also transmitted from the second sensor 42 to the controller 11. According to the second feedback signal, the controller 11 also records the current position point of the robotic arm 8 (i.e., a fourth current position point).

The third measuring device 5 comprises a third main body 50, a third sensor 51, a third measuring edge 52, a third linear track 53 and a third elastic element 54. The third sensor 51 and the third elastic element 54 are arranged near two opposite sides of the third linear track 53. The third sensor 51 is in communication with the controller 11 in the wired transmission manner or the wireless transmission manner. When the third sensor 51 is triggered, a third feedback signal is transmitted from the third sensor 51 to the controller 11. According to the third feedback signal, the controller 11 records the current position point of the robotic arm 8. The third main body 50 is movable in the X-axis direction. The third main body 50 comprises a sliding part 500 and a measuring part 501. The measuring part 501 is aligned with the third sensor 51. While the third measuring surface 51 drives the movement of the third main body 50 in the X-axis direction, the measuring part 501 is correspondingly moved in the X-axis direction. Consequently, the controller 11 records the current position point of the robotic arm 8 (i.e., a fifth current position point). The third sensor 51 comprises a sensing recess 520 corresponding to the measuring part 501. When the measuring part 501 is moved to the sensing recess 520, the third sensor 51 is triggered. Preferably but not exclusively, the third sensor 51 is a position sensor or a contact switch. The third linear track 53 is fixed on the corresponding pushing part 20 of the base 2. Moreover, the sliding part 500 matches the third linear track 53. Consequently, the third main body 50 can be slid relative to the third linear track 53. The third measuring edge 52 is a shape edge of a sharp-shaped block 55 of the third main body 50. The sharp-shaped block 55 is horizontally protruded from the third main body 50 and tapered in the direction toward the sensing space 12. Consequently, the shape edge of the sharp-shaped block 55 is created. Moreover, the third main body 50 is moved with the third measuring edge 52 in the X-axis direction. The third elastic element 54 is arranged between the third main body 50 and the corresponding pushing part 20. A first end of the third elastic element 54 is contacted with the corresponding pushing part 20. A second end of the third elastic element 54 is contacted with the third main body 50. When an external force from the third main body 50 is exerted on the third elastic element 54, the third elastic element 54 is compressed to generate an elastic restoring force. When the external force is no longer exerted on the third elastic element 54, the third main body 50 is returned to its original position in response to the elastic restoring force of the third elastic element 54.

The fourth measuring device 6 comprises a fourth main body 60, a fourth sensor 61, a fourth measuring edge 62, a fourth linear track 63 and a fourth elastic element 64. The structures, constituents and actions of the fourth main body 60, the fourth sensor 61, the fourth measuring edge 62, the fourth linear track 63 and the fourth elastic element 64 are similar to the third main body 50, the third sensor 51, the third measuring edge 52, the third linear track 53 and the third elastic element 54 of the third measuring device 5, and are not redundantly described herein. Whereas, the fourth main body 60 of the fourth measuring device 6 is movable in the Y-axis direction. Consequently, the fourth measuring edge 62 is moved with the fourth main body 60 in the Y-axis direction. While the fourth measuring edge 62 drives the movement of the fourth main body 60 to trigger the fourth sensor 61, a fourth feedback signal is also transmitted from the fourth sensor 61 to the controller 11. According to the fourth feedback signal, the controller 11 also records the current position point of the robotic arm 8 (i.e., a sixth current position point).

The fifth measuring device 7 comprises a fifth main body 70, a third measuring surface 71, a fifth sensor 72, a fifth linear track 73 and a fifth elastic element 74. The fifth sensor 72 and the fifth elastic element 74 are arranged near two opposite sides of the fifth linear track 73. The fifth sensor 72 is in communication with the controller 11 in the wired transmission manner or the wireless transmission manner. When the fifth sensor 72 is triggered, a fifth feedback signal is transmitted from the fifth sensor 72 to the controller 11. According to the fifth feedback signal, the controller 11 records the current position point of the robotic arm 8. The fifth main body 70 is movable in the Z-axis direction. The fifth main body 70 comprises a sliding part 700 and a measuring part 701. The measuring part 701 is aligned with the fifth sensor 72. While the third measuring surface 71 drives the movement of the fifth main body 70 in the Z-axis direction, the measuring part 701 is correspondingly moved in the Z-axis direction. When the measuring part 701 is moved to the position of the fifth sensor 72, the fifth sensor 72 is triggered by the measuring part 701. Consequently, the controller 11 records the current position point of the robotic arm 8 (i.e., a seventh current position point). The fifth sensor 72 comprises a sensing recess 720 corresponding to the measuring part 701. When the measuring part 701 is moved to the sensing recess 720, the fifth sensor 72 is triggered. Preferably but not exclusively, the fifth sensor 72 is a position sensor. The fifth linear track 73 is fixed on the top surface of the base 2. Moreover, the sliding part 700 matches the fifth linear track 73. Consequently, the fifth main body 70 can be slid relative to the fifth linear track 73. The third measuring surface 71 is horizontally protruded from a top surface of the fifth main body 70. Moreover, the fifth main body 70 is moved with the third measuring surface 71 in the Z-axis direction. The fifth elastic element 74 is arranged between the fifth main body 70 and the base 2. A first end of the fifth elastic element 74 is contacted with the base 2. A second end of the fifth elastic element 74 is contacted with the fifth main body 70. When an external force from the fifth main body 70 is exerted on the fifth elastic element 74, the fifth elastic element 74 is compressed to generate an elastic restoring force. When the external force is no longer exerted on the fifth elastic element 74, the fifth main body 70 is returned to its original position in response to the elastic restoring force of the fifth elastic element 74. In an embodiment, the fifth measuring device 7 is located outside the sensing space 12. Alternatively, the fifth measuring device 7 is disposed within the sensing space 12.

The tool 9 comprises a TCP 90 (i.e., a distal end). When the robotic arm 8 drives the tool 9 to be moved relative to the base 2, the TCP 90 of the tool 9 is movable within the sensing space 12, which is formed between the first measuring device 3, the second measuring device 4, the third measuring device 5 and the fourth measuring device 6. When the TCP 90 of the tool 9 is contacted with the first measuring surface 31 and the second measuring surface 41, the first measuring surface 31 and the second measuring surface 41 are correspondingly moved. Moreover, when the TCP 90 of the tool 9 is moved outside the sensing space 12 to be contacted with the third measuring surface 71, the third measuring surface 71 is correspondingly moved. Moreover, when the robotic arm 8 drives the movement of the tool 9 within the sensing space 12, the outer surface of a cross section of the tool 9 may be contacted with one of the first measuring edge 33 and the third measuring edge 52 and one of the second measuring edge 43 and the fourth measuring edge 62. Consequently, the corresponding measuring edges are correspondingly moved. As mentioned above, the tool 9 is movable within the sensing space 12 or movable over the base 2. That is, the tool 9 is movable outside the sensing space 12.

As shown in FIGS. 1 and 2, the base 2 further comprises a hollow portion 21. The hollow portion 21 is aligned with the sensing space 12. While the robotic arm 8 drives the movement of the tool 9 within the sensing space 12 to adjust the measuring altitude of the tool 9, the tool 9 can be inserted into the hollow portion 21. Since the measuring altitude of the tool 9 can be adjusted freely, the movement of the tool 9 is not limited by the base 2. Moreover, the distance between the first measuring device 3 and the third measuring device 5 is a fixed and known value, and the distance between the second measuring device 4 and the fourth measuring device 6 is also a fixed and known value.

As mentioned above, when the tool center point or any region of the tool 9 is contacted with the inner structure of the tool calibration apparatus 1, the controller 11 records the current position of the robotic arm 8. Consequently, the current position point of the robotic arm 8 recorded by the controller 11 is related to the position of the tool 9. In other words, the position of the tool 9 is realized according to the current position point of the robotic arm 8.

Hereinafter, the use of the tool calibration apparatus 1 to calibrate the TCP of the tool 9, calibrate the axis direction of the tool 9 and calibrate the dimension of the tool 9 will be described sequentially. In an embodiment, the tool 9 is a symmetric-type tool.

First of all, the TCP calibration of the tool 9 is performed by the tool calibration apparatus 1. For example, the movement in the X-axis direction is sensed. While the robotic arm 8 drives the movement of the tool 9 in the X-axis direction, the TCP 90 of the tool 9 is moved within the sensing space 12 in the X-axis direction. In addition, the TCP 90 of the tool 9 is moved from an initial position to the first measuring surface 31. When the TCP 90 of the tool 9 is contacted with the first measuring surface 31, the first measuring surface 31 is pushed to be slid along the first linear track 34. As the first measuring surface 31 is moved, the first main body 30 is correspondingly moved to provide an external force to the first elastic element 35. Consequently, the first elastic element 35 is compressed to generate an elastic restoring force. As the first measuring surface 31 is moved, the measuring part 301 of the first main body 30 is moved into the sensing recess 320 of the first sensor 32. Consequently, the first sensor 32 is triggered by the measuring part 301, and the controller 11 records the current position point of the robotic arm 8 (i.e., a first current position point). Then, the robotic arm 8 drives the movement of the tool 9 in the direction reverse to the X-axis direction. In response to the elastic restoring force of the first elastic element 35, the first measuring surface 31 is returned to the initial position.

The way of sensing the movement in the Y-axis direction is similar to the way of sensing the movement in the X-axis direction. While the robotic arm 8 drives the movement of the tool 9 in the Y-axis direction, the TCP 90 of the tool 9 is moved within the sensing space 12 in the Y-axis direction. In addition, the TCP 90 of the tool 9 is moved from an initial position to the second measuring surface 41. When the TCP 90 of the tool 9 is contacted with the second measuring surface 41, the second measuring surface 41 is pushed to be slid along the second linear track 44. As the second measuring surface 41 is moved, the second main body 40 is correspondingly moved to provide an external force to the second elastic element 45. Consequently, the second elastic element 45 is compressed to generate an elastic restoring force. As the second measuring surface 41 is moved, the measuring part of the second main body 40 is moved into the sensing recess of the second sensor 42. Consequently, the second sensor 42 is triggered, and the controller 11 records the current position point of the robotic arm 8 (i.e., a third current position point). Then, the robotic arm 8 drives the movement of the tool 9 in the direction reverse to the Y-axis direction. In response to the elastic restoring force of the second elastic element 45, the second measuring surface 41 is returned to the initial position.

The way of sensing the movement in the Z-axis direction is similar to the way of sensing the movement in the X-axis direction. While the robotic arm 8 drives the movement of the tool 9 in the Z-axis direction, the TCP 90 of the tool 9 is moved within the sensing space 12 in the Z-axis direction. In addition, the TCP 90 of the tool 9 is moved from an initial position to the third measuring surface 71. When the TCP 90 of the tool 9 is contacted with the third measuring surface 71, the third measuring surface 71 is pushed to be slid along the fifth linear track 73. As the third measuring surface 71 is moved, the fifth main body 70 is correspondingly moved to provide an external force to the fifth elastic element 74. Consequently, the fifth elastic element 74 is compressed to generate an elastic restoring force. As the third measuring surface 71 is moved, the measuring part 701 of the fifth main body 70 is moved into the sensing recess 720 of the fifth sensor 72. Consequently, the fifth sensor 72 is triggered, and the controller 11 records the current position point of the robotic arm 8 (i.e., a seventh current position point). Then, the robotic arm 8 drives the movement of the tool 9 in the direction reverse to the Z-axis direction. In response to the elastic restoring force of the fifth elastic element 74, the third measuring surface 71 is returned to the initial position.

After the movements in the X-axis direction, the Y-axis direction and the Z-axis direction are sensed, the controller 11 records the first current position point, the third current position point and the seventh current position point. The first current position point is obtained when the TCP 90 of the tool 9 pushes the first measuring surface 31 to trigger the first sensor 32. The third current position point is obtained when the TCP 90 of the tool 9 pushes the second measuring surface 41 to trigger the second sensor 42. The seventh current position point is obtained when the TCP 90 of the tool 9 pushes the third measuring surface 71 to trigger the fifth sensor 72. In other words, the first current position point, the third current position point and the seventh current position point are related to the position of the TCP 90 of the tool 9. Consequently, the relationship between the TCP 90 of the tool 9 and the end-effect position point of the robotic arm 8 is acquired and the TCP calibration of the tool 9 is accomplished.

The operations of the TCP calibration on the asymmetric-type tool are similar to the operations of the TCP calibration on the symmetric-type tool, and are not redundantly described herein.

The use of the tool calibration apparatus 1 to calibrate the axis direction of the tool 9 will be described as follows.

Firstly, the robotic arm 8 drives movement of the tool 9 within the sensing space 12 in a first measuring altitude (i.e., the measuring altitude of the TCP 90 of the tool 9 relative to the base 2 as shown in FIG. 4A). For example, the tool 9 is a symmetric-type tool. In addition, the tool 9 is moved from an initial position to one of the first measuring edge 33 and the third measuring edge 52 and one of the second measuring edge 43 and the fourth measuring edge 62. When two contact points of a first cross section A of the tool 9 are contacted with one of the first measuring edge 33 and the third measuring edge 52 and one of the second measuring edge 43 and the fourth measuring edge 62, the corresponding measuring edges are slid along the corresponding linear tracks to trigger one of the first sensor 32 and the third sensor 51 and one of the second sensor 42 and the fourth sensor 61. Meanwhile, the controller 11 records plural current position points of the robotic arm 8 corresponding to the first measuring altitude of the tool 9. That is, the current position point corresponding to one of the first sensor 32 and the third sensor 51 (i.e., the second current position point or the fifth current position point) and the current position point corresponding to one of the second sensor 42 and the fourth sensor 61 (i.e., the fourth current position point or the sixth current position point) are recorded. Then, the robotic arm 8 drives the movement of the tool 9 within the sensing space 12 and to the initial position, and thus the tool 9 is not contacted with any measuring edge. In response to the elastic restoring forces of the corresponding elastic elements, the corresponding measuring edges are returned to the initial positions. As mentioned above, the tool 9 is a symmetric-type tool. According to the second current position point (or the fifth current position point) and the fourth current position point (or the sixth current position point) corresponding to the first measuring attitude of the tool 9, the axis center position of the first cross section A of the tool 9 is deduced.

Then, the robotic arm 8 adjusts the tool 9 to a second measuring altitude, which is different from the first measuring attitude. The tool 9 is moved within the sensing space 12 in the second measuring altitude (i.e., the measuring altitude of the TCP 90 of the tool 9 relative to the base 2 as shown in FIG. 4B). As shown in FIGS. 4A and 4B, the measuring altitude of the TCP 90 of the tool 9 relative to the base 2 as shown in FIG. 4B is higher than the measuring altitude of the TCP 90 of the tool 9 relative to the base 2 as shown in FIG. 4A. In other words, the position of the tool 9 as shown in FIG. 4B is higher than the position of the tool 9 as shown in FIG. 4A. In addition, the tool 9 is moved from an initial position to one of the first measuring edge 33 and the third measuring edge 52 and one of the second measuring edge 43 and the fourth measuring edge 62. When two contact points of a second cross section B of the tool 9 are contacted with one of the first measuring edge 33 and the third measuring edge 52 and one of the second measuring edge 43 and the fourth measuring edge 62, the corresponding measuring edges are slid along the corresponding linear tracks to trigger one of the first sensor 32 and the third sensor 51 and one of the second sensor 42 and the fourth sensor 61. Meanwhile, the controller 11 records plural current position points of the robotic arm 8 corresponding to the second measuring altitude of the tool 9. That is, the current position point corresponding to one of the first sensor 32 and the third sensor 51 (i.e., the second current position point or the fifth current position point) and the current position point corresponding to one of the second sensor 42 and the fourth sensor 61 (i.e., the fourth current position point or the sixth current position point) are recorded. Then, the robotic arm 8 drives the movement of the tool 9 within the sensing space 12 and to the initial position, and thus the tool 9 is not contacted with any measuring edge. In response to the elastic restoring forces of the corresponding elastic elements, the corresponding measuring edges are returned to the initial positions. As mentioned above, the tool 9 is a symmetric-type tool. According to the second current position point (or the fifth current position point) and the fourth current position point (or the sixth current position point) corresponding to the second measuring attitude of the tool 9, the axis center position of the second cross section B of the tool 9 is deduced.

According to the axis center position of the first cross section A of the tool 9, the axis center position of the second cross section B of the tool 9 and the known height difference between the first measuring altitude and the second measuring attitude, the axis direction information of the tool 9 is obtained. Consequently, the axis direction of the tool 9 can be effectively calibrated.

In some embodiments, the axis direction of the robotic arm 8 is also known. After the axis direction information of the tool 9 is obtained, the rotation angle of the axis direction of the tool 9 with respect to the axis direction of the robotic arm 8 can be calculated.

In another embodiment, the tool 9 is an asymmetric-type tool. Firstly, the robotic arm 8 drives movement of the tool 9 within the sensing space 12 in a first measuring altitude. In addition, the tool 9 is moved from an initial position to the first measuring edge 33, the second measuring edge 43, the third measuring edge 52 and the fourth measuring edge 62 sequentially. When four contact points of the first cross section A of the tool 9 are respectively contacted with the first measuring edge 33, the second measuring edge 43, the third measuring edge 52 and the fourth measuring edge 62, the first measuring edge 33, the second measuring edge 43, the third measuring edge 52 and the fourth measuring edge 62 are respectively slid along the first linear track 34, the second linear track 44, the third linear track 53 and the fourth linear track 63. Consequently, the first sensor 32, the second sensor 42, the third sensor 51 and the fourth sensor 61 are sequentially triggered. Meanwhile, the controller 11 records plural current position points of the robotic arm 8 corresponding to the first measuring altitude of the tool 9. That is, the current position point corresponding to the first sensor 32 (i.e., the second current position point), the current position point corresponding to the second sensor 42 (i.e., the fourth current position point), the current position point corresponding to the third sensor 51 (the fifth current position point) and the current position point corresponding to the fourth sensor 61 (i.e., the sixth current position point) are recorded. Then, the robotic arm 8 drives the movement of the tool 9 within the sensing space 12 such that the tool 9 is not contacted with any measuring edge. In response to the elastic restoring forces of the corresponding elastic elements 35, 45, 54 and 64, the corresponding measuring edges 33, 43, 52 and 62 are returned to the initial positions. According to the second current position point, the fourth current position point, the fifth current position point and the sixth current position point corresponding to the first measuring attitude of the tool 9, the axis center position of the first cross section A of the tool 9 is deduced.

Then, the robotic arm 8 adjusts the tool 9 to a second measuring altitude, which is different from the first measuring attitude. The tool 9 is moved within the sensing space 12 in the second measuring altitude. In addition, the tool 9 is moved from an initial position to the first measuring edge 33, the second measuring edge 43, the third measuring edge 52 and the fourth measuring edge 62 sequentially. When four contact points of the second cross section B of the tool 9 are respectively contacted with the first measuring edge 33, the second measuring edge 43, the third measuring edge 52 and the fourth measuring edge 62, the first measuring edge 33, the second measuring edge 43, the third measuring edge 52 and the fourth measuring edge 62 are respectively slid along the first linear track 34, the second linear track 44, the third linear track 53 and the fourth linear track 63. Consequently, the first sensor 32, the second sensor 42, the third sensor 51 and the fourth sensor 61 are sequentially triggered. Meanwhile, the controller 11 records plural current position points of the robotic arm 8 corresponding to the second measuring altitude of the tool 9. That is, the current position point corresponding to the first sensor 32 (i.e., the second current position point), the current position point corresponding to the second sensor 42 (i.e., the fourth current position point), the current position point corresponding to the third sensor 51 (the fifth current position point) and the current position point corresponding to the fourth sensor 61 (i.e., the sixth current position point) are recorded. Then, the robotic arm 8 drives the movement of the tool 9 within the sensing space 12 such that the tool 9 is not contacted with any measuring edge. In response to the elastic restoring forces of the corresponding elastic elements 35, 45, 54 and 64, the corresponding measuring edges 33, 43, 52 and 62 are returned to the initial positions. According to the second current position point, the fourth current position point, the fifth current position point and the sixth current position point corresponding to the second attitude of the tool 9, the axis center position of the second cross section B of the tool 9 is deduced.

According to the axis center position of the first cross section A of the tool 9, the axis center position of the second cross section B of the tool 9 and the known height difference between the first measuring altitude and the second measuring attitude, the axis direction information of the tool 9 is obtained. Consequently, the axis direction of the tool 9 can be effectively calibrated.

In some embodiments, the axis direction of the robotic arm 8 is also known. After the axis direction information of the tool 9 is obtained, the rotation angle of the axis direction of the tool 9 with respect to the axis direction of the robotic arm 8 can be calculated.

The use of the tool calibration apparatus 1 to calibrate the dimension of the tool 9 will be described as follows.

After the axis direction information of the tool 9 is obtained, the robotic arm 8 adjusts the axis direction of the tool 9 to be perpendicular to the base 2 (i.e., perpendicular to the XY plane). Then, the robotic arm 8 adjusts the tool 9 to a third measuring altitude. The tool 9 is moved within the sensing space 12 in the third measuring altitude. In addition, the tool 9 is moved from an initial position to the first measuring edge 33, the second measuring edge 43, the third measuring edge 52 and the fourth measuring edge 62 sequentially. When four contact points of a third cross section (not shown) of the tool 9 are respectively contacted with the first measuring edge 33, the second measuring edge 43, the third measuring edge 52 and the fourth measuring edge 62, the first measuring edge 33, the second measuring edge 43, the third measuring edge 52 and the fourth measuring edge 62 are respectively slid along the first linear track 34, the second linear track 44, the third linear track 53 and the fourth linear track 63. Consequently, the first sensor 32, the second sensor 42, the third sensor 51 and the fourth sensor 61 are sequentially triggered. Meanwhile, the controller 11 records plural current position points of the robotic arm 8 corresponding to the third measuring altitude of the tool 9. That is, the current position point corresponding to the first sensor 32 (i.e., the second current position point), the current position point corresponding to the second sensor 42 (i.e., the fourth current position point), the current position point corresponding to the third sensor 51 (the fifth current position point) and the current position point corresponding to the fourth sensor 61 (i.e., the sixth current position point) are recorded. Then, the robotic arm 8 drives the movement of the tool 9 within the sensing space 12 such that the tool 9 is not contacted with any measuring edge. In response to the elastic restoring forces of the corresponding elastic elements 35, 45, 54 and 64, the corresponding measuring edges 33, 43, 52 and 62 are returned to the initial positions.

Then, the robotic arm 8 adjusts the tool 9 to a fourth measuring altitude, which is different from the third measuring attitude. The tool 9 is moved within the sensing space 12 in the fourth measuring altitude. In addition, the tool 9 is moved from an initial position to the first measuring edge 33, the second measuring edge 43, the third measuring edge 52 and the fourth measuring edge 62 sequentially. When four contact points of a fourth cross section (not shown) of the tool 9 are respectively contacted with the first measuring edge 33, the second measuring edge 43, the third measuring edge 52 and the fourth measuring edge 62, the first measuring edge 33, the second measuring edge 43, the third measuring edge 52 and the fourth measuring edge 62 are respectively slid along the first linear track 34, the second linear track 44, the third linear track 53 and the fourth linear track 63. Consequently, the first sensor 32, the second sensor 42, the third sensor 51 and the fourth sensor 61 are sequentially triggered. Meanwhile, the controller 11 records plural current position points of the robotic arm 8 corresponding to the fourth measuring altitude of the tool 9. That is, the current position point corresponding to the first sensor 32 (i.e., the second current position point), the current position point corresponding to the second sensor 42 (i.e., the fourth current position point), the current position point corresponding to the third sensor 51 (the fifth current position point) and the current position point corresponding to the fourth sensor 61 (i.e., the sixth current position point) are recorded. Then, the robotic arm 8 drives the movement of the tool 9 within the sensing space 12 such that the tool 9 is not contacted with any measuring edge. In response to the elastic restoring forces of the corresponding elastic elements 35, 45, 54 and 64, the corresponding measuring edges 33, 43, 52 and 62 are returned to the initial positions.

According to the second current position point, the fourth current position point, the fifth current position point and the sixth current position point corresponding to the third measuring attitude of the tool 9 and the second current position point, the fourth current position point, the fifth current position point and the sixth current position point corresponding to the fourth measuring attitude of the tool 9, the relative distance between the first measuring device 3 and the third measuring device 5 and the relative distance between the second measuring device 4 and the fourth measuring device 6, the dimension of the tool 9 is obtained. Consequently, the dimension of the tool 9 can be calibrated. Of course, the first measuring altitude and the third measuring altitude may be identical or different, and second measuring altitude and the fourth measuring altitude may be identical or different.

In case that the cross section of the tool 9 possesses point symmetry (e.g., a circular cross section, a rectangular cross section, a rhombus cross section or a hexagonal cross section), the robotic arm 8 may drive rotation of the tool 9 at any rotation angle. As the tool 9 is rotated, the tool 9 is contacted with the first measuring edge 33, the second measuring edge 43, the third measuring edge 52 and the fourth measuring edge 62 sequentially. That is, the first measuring edge 33, the second measuring edge 43, the third measuring edge 52 and the fourth measuring edge 62 are respectively slid along the first linear track 34, the second linear track 44, the third linear track 53 and the fourth linear track 63. Consequently, the first sensor 32, the second sensor 42, the third sensor 51 and the fourth sensor 61 are sequentially triggered. Meanwhile, the controller 11 records plural current position points of the robotic arm 8. That is, the current position point corresponding to the first sensor 32 (i.e., the second current position point), the current position point corresponding to the second sensor 42 (i.e., the fourth current position point), the current position point corresponding to the third sensor 51 (the fifth current position point) and the current position point corresponding to the fourth sensor 61 (i.e., the sixth current position point) are recorded. According to the second current position point, the fourth current position point, the fifth current position point and the sixth current position point, the rotation angle of the tool 9 is realized.

The operations of the dimension calibration on the asymmetric-type tool are similar to the operations of the dimension calibration on the symmetric-type tool, and are not redundantly described herein.

In accordance with a feature of the present disclosure, the tool calibration apparatus 1 is not equipped with the infrared sensor. Consequently, the fabricating cost is reduced. In addition, the tool calibration apparatus 1 can be modularized. By moving the first measuring surface 31 of the first measuring device 3, the second measuring surface 41 of the second measuring device 4 and the third measuring surface 71 of the fifth measuring device 7, the controller 11 of the tool calibration apparatus 1 records plural current position points of the robotic arm 8. Consequently, the relative offset between the TCP of the tool 9 and the end-effect position point of the robotic arm 8 can be accurately measured and acquired. Moreover, by contacting the tool 9 with the first measuring edge 33 of the first measuring device 3, the second measuring edge 43 of the second measuring device 4, the third measuring edge 52 of the third measuring device 5 and the fourth measuring edge 62 of the fourth measuring device 6, the controller 11 of the tool calibration apparatus 1 records plural current position points of the robotic arm 8. According to the plural current position points, the axis direction information of the tool 9 in the initial state, the dimension of the tool 9 and the rotation angle of the tool 9 are obtained. Consequently, the robotic arm 8 can quickly and precisely compensate the accuracy of the tool. In other words, the tool 9 can be accurately operated. In comparison with the manual calibration method, the tool calibration apparatus 1 of the present disclosure is time-saving while achieving high precise calibration and increasing the applications.

Figure 5:
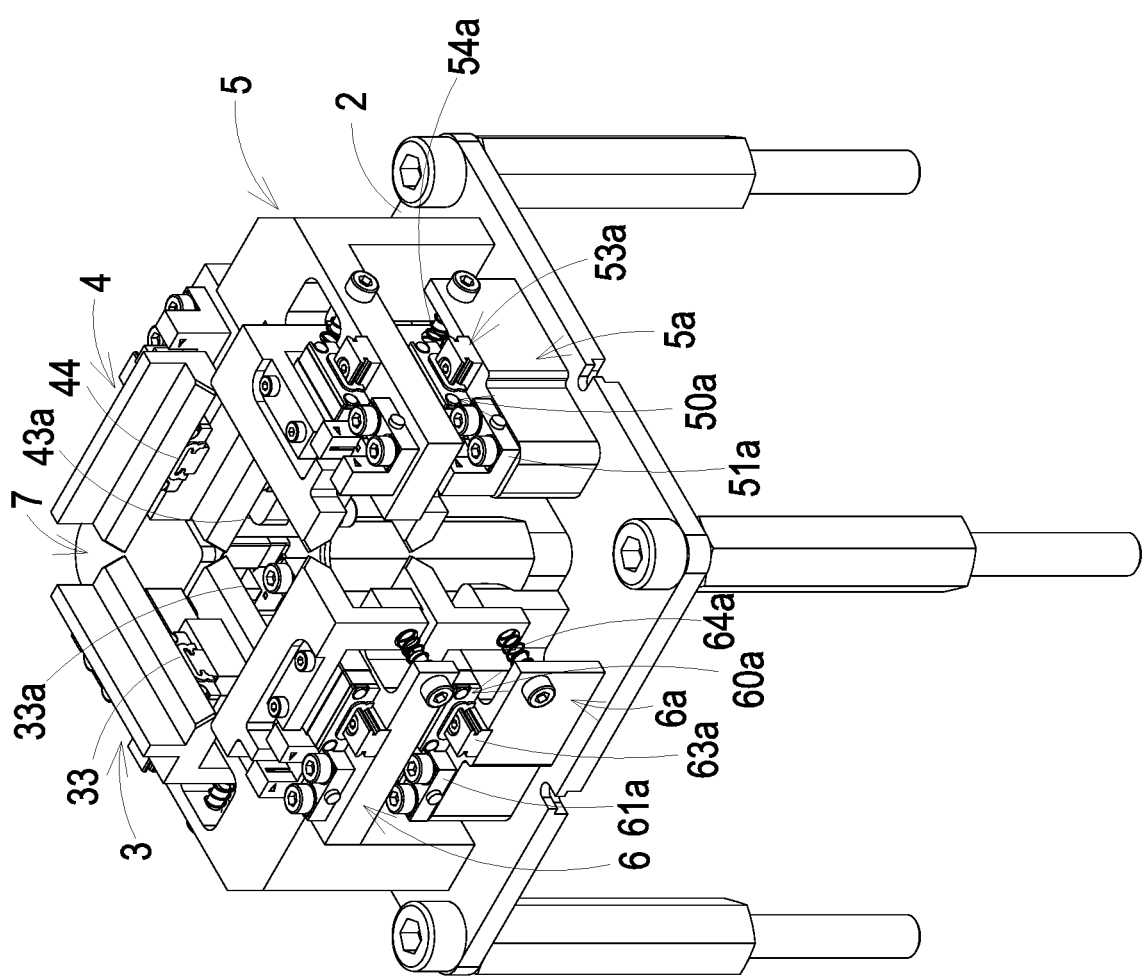
FIG. 5 is a schematic perspective view illustrating a tool calibration apparatus according to a second embodiment of the present disclosure.
Figure 6:
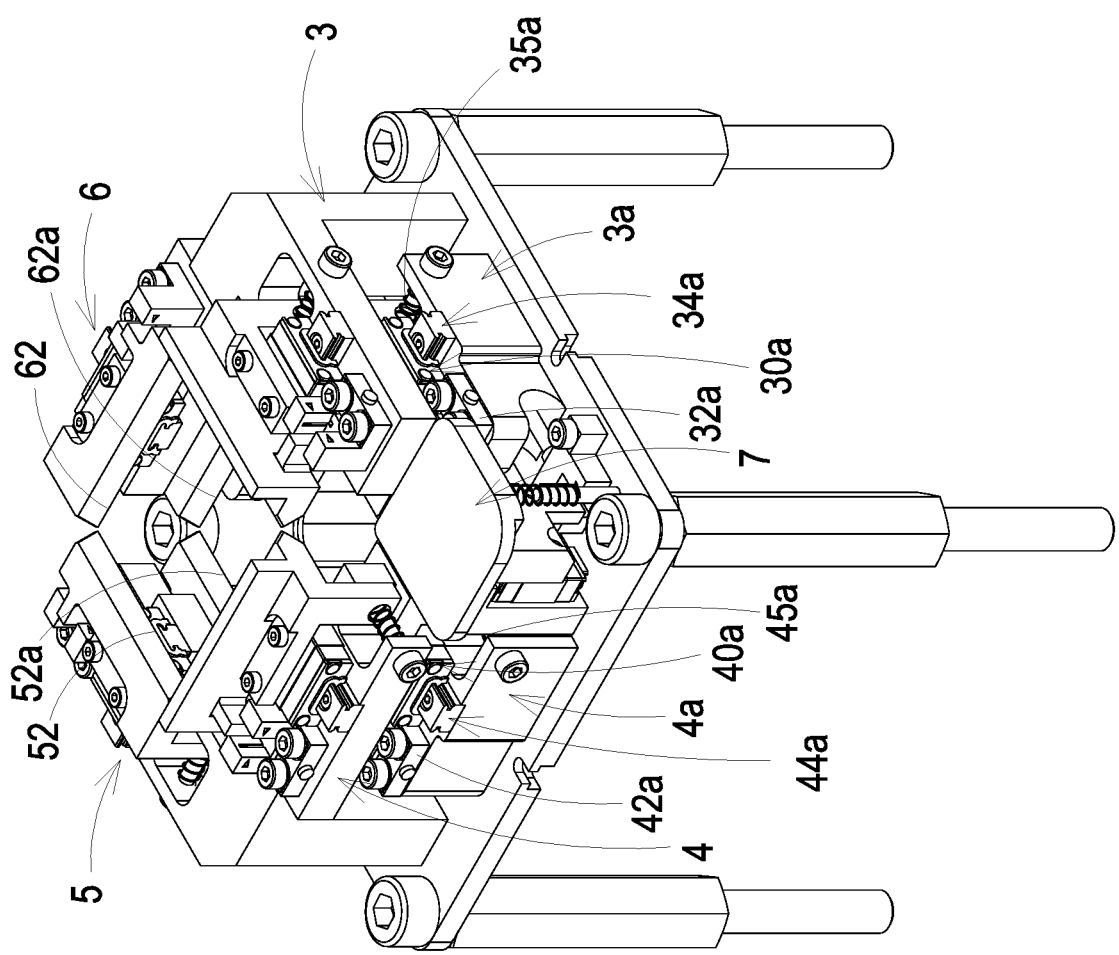
FIG. 6 is a schematic perspective view illustrating the tool calibration apparatus of FIG. 5 and taken along another viewpoint.

FIG. 5 is a schematic perspective view illustrating a tool calibration apparatus according to a second embodiment of the present disclosure. FIG. 6 is a schematic perspective view illustrating the tool calibration apparatus of FIG. 5 and taken along another viewpoint. Like the first embodiment of FIG. 1, the tool calibration apparatus 1 of this embodiment also comprises the base 2, the first measuring device 3, the second measuring device 4, the third measuring device 5, the fourth measuring device 6 and the fifth measuring device 7. In comparison with the first embodiment, the tool calibration apparatus 1 of this embodiment further comprises a sixth measuring device 3a, a seventh measuring device 4a, an eighth measuring device 5a and a ninth measuring device 6a. Moreover, the base 2 comprises eight pushing parts 20. The eight pushing parts 20 are arranged near the first measuring device 3, the second measuring device 4, the third measuring device 5, the fourth measuring device 6, the sixth measuring device 3a, the seventh measuring device 4a, the eighth measuring device 5a and the ninth measuring device 6a, respectively. The sixth measuring device 3a, the seventh measuring device 4a, the eighth measuring device 5a and the ninth measuring device 6a are disposed on the base 2. The sixth measuring device 3a and the first measuring device 3 are arranged near and aligned with each other. The seventh measuring device 4a and the second measuring device 4 are arranged near and aligned with each other. The eighth measuring device 5a and the third measuring device 5 are arranged near and aligned with each other. The ninth measuring device 6a and the fourth measuring device 6 are arranged near and aligned with each other.

The sixth measuring device 3a comprises a sixth main body 30a, a sixth sensor 32a, a sixth measuring edge 33a, a sixth linear track 34a and a sixth elastic element 35a. In comparison with the first measuring device 3, the sixth measuring device 3a is not equipped with the first measuring surface 31. The structures and functions of the sixth main body 30a, the sixth sensor 32a, the sixth measuring edge 33a, the sixth linear track 34a and the sixth elastic element 35a of the sixth measuring device 3a are similar to the structures and functions of the first main body 30, the first sensor 32, the first measuring edge 33, the first linear track 34 and the first elastic element 35 of the first measuring device 3 and are not be redundantly described herein. The sixth measuring edge 33a of the sixth measuring device 3a is located under the first measuring edge 33 of the first measuring device 3 and is in parallel with and corresponding in position to the first measuring edge 33. When the tool (not shown) is contacted with the sixth measuring edge 33a and the sixth measuring edge 33a is moved in the X-axis direction to trigger the sixth sensor 32a, the sixth sensor 32a generates a sixth feedback signal to the controller. Consequently, the controller for controlling the robotic arm records the current position point of the robotic arm (i.e., an eighth current position point).

The seventh measuring device 4a comprises a seventh main body 40a, a seventh sensor 42a, a seventh measuring edge 43a, a seventh linear track 44a and a seventh elastic element 45a. In comparison with the second measuring device 4, the seventh measuring device 4a is not equipped with the second measuring surface 41. The structures and functions of the seventh main body 40a, the seventh sensor 42a, the seventh measuring edge 43a, the seventh linear track 44a and the seventh elastic element 45a of the seventh measuring device 4a are similar to the structures and functions of the second main body 40, the second sensor 42, the second measuring edge 43, the second linear track 44 and the second elastic element 45 of the second measuring device 4 and are not be redundantly described herein. The seventh measuring edge 43a of the seventh measuring device 4a is located under the second measuring edge 43 of the second measuring device 4 and is in parallel with and corresponding in position to the second measuring edge 43. When the tool (not shown) is contacted with the seventh measuring edge 43a and the seventh measuring edge 43a is moved in the Y-axis direction to trigger the seventh sensor 42a, the seventh sensor 42a generates a seventh feedback signal to the controller. Consequently, the controller for controlling the robotic arm records the current position point of the robotic arm (i.e., a ninth current position point).

The structure of the eighth measuring device 5a is similar to that of the third measuring device 5. The eighth measuring device 5a comprises an eighth main body 50a, an eighth sensor 51a, an eighth measuring edge 52a, an eighth linear track 53a and an eighth elastic element 54a. The structures and functions of the eighth main body 50a, the eighth sensor 51a, the eighth measuring edge 52a, the eighth linear track 53a and the eighth elastic element 54a of the eighth measuring device 5a are similar to the structures and functions of the third main body 50, the third sensor 51, the third measuring edge 52, the third linear track 53 and the third elastic element 54 of the third measuring device 5 and are not be redundantly described herein. The eighth measuring edge 52a of the eighth measuring device 5a is located under the third measuring edge 52 of the third measuring device 5 and is in parallel with and corresponding in position to the third measuring edge 52. When the tool (not shown) is contacted with the eighth measuring edge 52a and the eighth measuring edge 52a is moved in the X-axis direction to trigger the eighth sensor 51a, the eighth sensor 51a generates an eighth feedback signal to the controller. Consequently, the controller for controlling the robotic arm records the current position point of the robotic arm (i.e., a tenth current position point).

The structure of the ninth measuring device 6a is similar to that of the fourth measuring device 6. The ninth measuring device 6a comprises a ninth main body 60a, a ninth sensor 61a, a ninth measuring edge 62a, a ninth linear track 63a and a ninth elastic element 64a. The structures and functions of the ninth main body 60a, the ninth sensor 61a, the ninth measuring edge 62a, the ninth linear track 63a and the ninth elastic element 64a of the ninth measuring device 6a are similar to the structures and functions of the fourth main body 60, the fourth sensor 61, the fourth measuring edge 62, the fourth linear track 63 and the fourth elastic element 64 of the fourth measuring device 6 and are not be redundantly described herein. The ninth measuring edge 62a of the ninth measuring device 6a is located under the fourth measuring edge 62 of the fourth measuring device 6 and is in parallel with and corresponding in position to the fourth measuring edge 62. When the tool (not shown) is contacted with the ninth measuring edge 62a and the ninth measuring edge 62a is moved in the X-axis direction to trigger the ninth sensor 61a, the ninth sensor 61a generates a ninth feedback signal to the controller. Consequently, the controller for controlling the robotic arm records the current position point of the robotic arm (i.e., an eleventh current position point).

Moreover, the distance between the sixth measuring edge 33a of the sixth measuring device 3a and the first measuring edge 33 of the first measuring device 3, the distance between the seventh measuring edge 43a of the seventh measuring device 4a and the second measuring edge 43 of the second measuring device 4, the distance between the eighth measuring edge 52a of the eighth measuring device 5a and the third measuring edge 52 of the third measuring device 5 and the distance between the ninth measuring edge 62a of the ninth measuring device 6a and the fourth measuring edge 62 of the fourth measuring device 6 are equal and known. Moreover, the first ends of the elastic elements of the first measuring device 3, the second measuring device 4, the third measuring device 5, the fourth measuring device 6, the sixth measuring device 3a, the seventh measuring device 4a, the eighth measuring device 5a and the ninth measuring device 6a are contacted with the corresponding pushing parts 20. Especially, the distance between the sixth measuring edge 33a of the sixth measuring device 3a and the first measuring edge 33 of the first measuring device 3, the distance between the seventh measuring edge 43a of the seventh measuring device 4a and the second measuring edge 43 of the second measuring device 4, the distance between the eighth measuring edge 52a of the eighth measuring device 5a and the third measuring edge 52 of the third measuring device 5 and the distance between the ninth measuring edge 62a of the ninth measuring device 6a and the fourth measuring edge 62 of the fourth measuring device 6 are equal.

For example, the tool 9 is an asymmetric-type tool. When the tool calibration apparatus 1 is used to calibrate the axis direction and the dimension of the tool 9, the robotic arm 8 drives movement of the tool 9 within the sensing space 12 in a single measuring altitude only. In addition, the tool 9 is moved from an initial position to the first measuring edge 33, the second measuring edge 43, the third measuring edge 52 and the fourth measuring edge 62 sequentially. When four contact points of a fifth cross section of the tool 9 are respectively contacted with the first measuring edge 33, the second measuring edge 43, the third measuring edge 52 and the fourth measuring edge 62, the first sensor 32, the second sensor 42, the third sensor 51 and the fourth sensor 61 are sequentially triggered. Meanwhile, the controller records plural current position points of the robotic arm 8 corresponding to the first measuring altitude of the tool 9. That is, the second current position point, the fourth current position point, the fifth current position point and the sixth current position point are recorded. When four contact points of a sixth cross section of the tool 9 are respectively contacted with the sixth measuring device 3a, the seventh measuring device 4a, the eighth measuring device 5a and the ninth measuring device 6a, the sixth sensor 32a, the seventh sensor 42a, the eighth sensor 51a and the ninth sensor 61a are triggered. Meanwhile, the controller records plural current position points of the robotic arm 8 corresponding to the first measuring altitude of the tool 9. That is, the eighth current position point, the ninth current position point, the tenth current position point and the eleventh current position point are recorded. Consequently, the axis direction information of the tool 9 is acquired according to the second current position point, the fourth current position point, the fifth current position point, the sixth current position point, the eighth current position point, the ninth current position point, the tenth current position point, the eleventh current position point, the distance between the sixth measuring edge 33a and the first measuring edge 33, the distance between the seventh measuring edge 43a and the second measuring edge 43, the distance between the eighth measuring edge 52a and the third measuring edge 52 and the distance between the ninth measuring edge 62a and the fourth measuring edge 62. Moreover, the dimension of the tool 9 is obtained according to the second current position point, the fourth current position point, the fifth current position point, the sixth current position point, the eighth current position point, the ninth current position point, the tenth current position point, the eleventh current position point, the relative distance between the first measuring device 3 and the third measuring device 5 and the relative distance between the second measuring device 4 and the fourth measuring device 6. In this embodiment, it is not necessary for the robotic arm 8 to move the tool 9 within the sensing space 12 in two different measuring altitudes.

As shown in FIGS. 5 and 6, the tool calibration apparatus 1 of this embodiment is further equipped with the sixth measuring device 3a, the seventh measuring device 4a, the eighth measuring device 5a and the ninth measuring device 6a. For installing these measuring devices, the heights or sizes of the first measuring device 3, the second measuring device 4, the third measuring device 5 and the fourth measuring device 6 are adjusted. Consequently, the overall heights of the first measuring device 3, the second measuring device 4, the third measuring device 5 and the fourth measuring device 6 as shown in FIGS. 5 and 6 are larger than the overall heights of the first measuring device 3, the second measuring device 4, the third measuring device 5 and the fourth measuring device 6 as shown in FIGS. 1 and 2.

In the above embodiments, the way of acquiring the information of the tool according to the current position points of the robotic arm is not the subject matter of the present disclosure. In addition, the principles of obtaining the information of the tool according to the current position points of the robotic arm are well known to those skilled in the art. Consequently, the principles of obtaining the information of the tool according to the current position points of the robotic arm are not be redundantly described herein.

Figure 7:
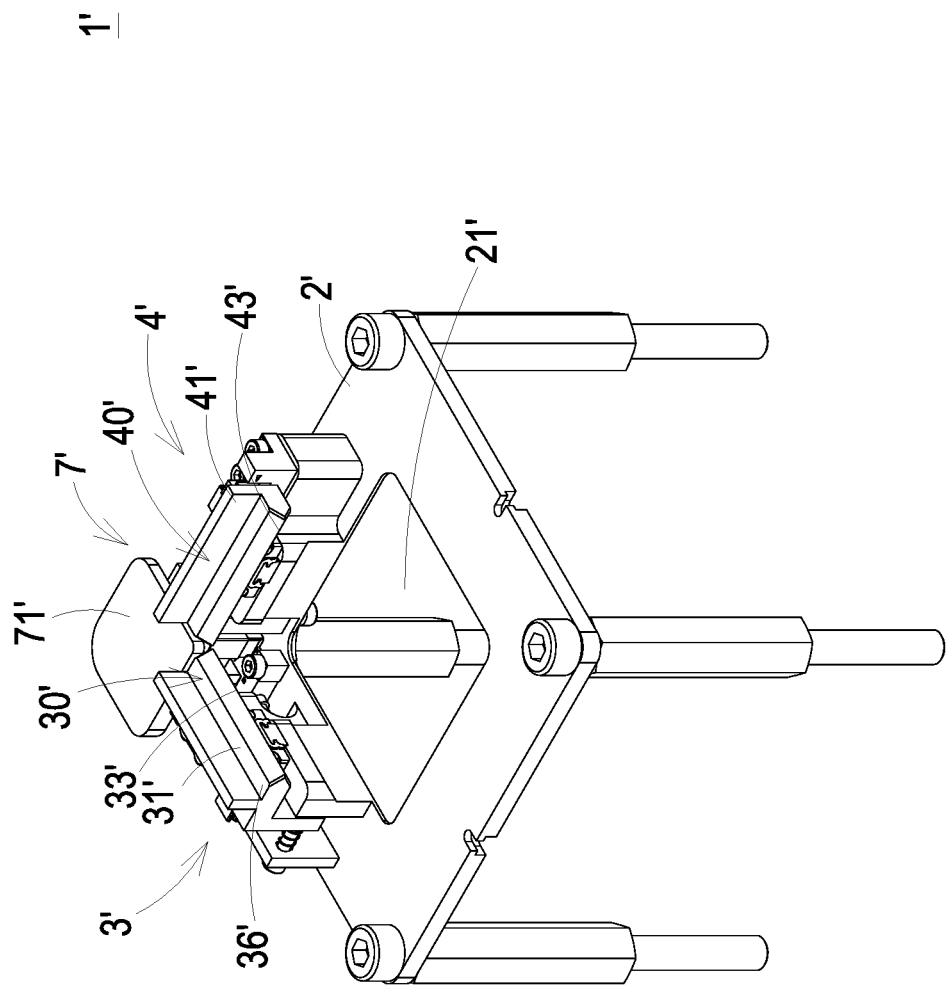
FIG. 7 is a schematic perspective view illustrating a tool calibration apparatus according to a third embodiment of the present disclosure.
Figure 8:
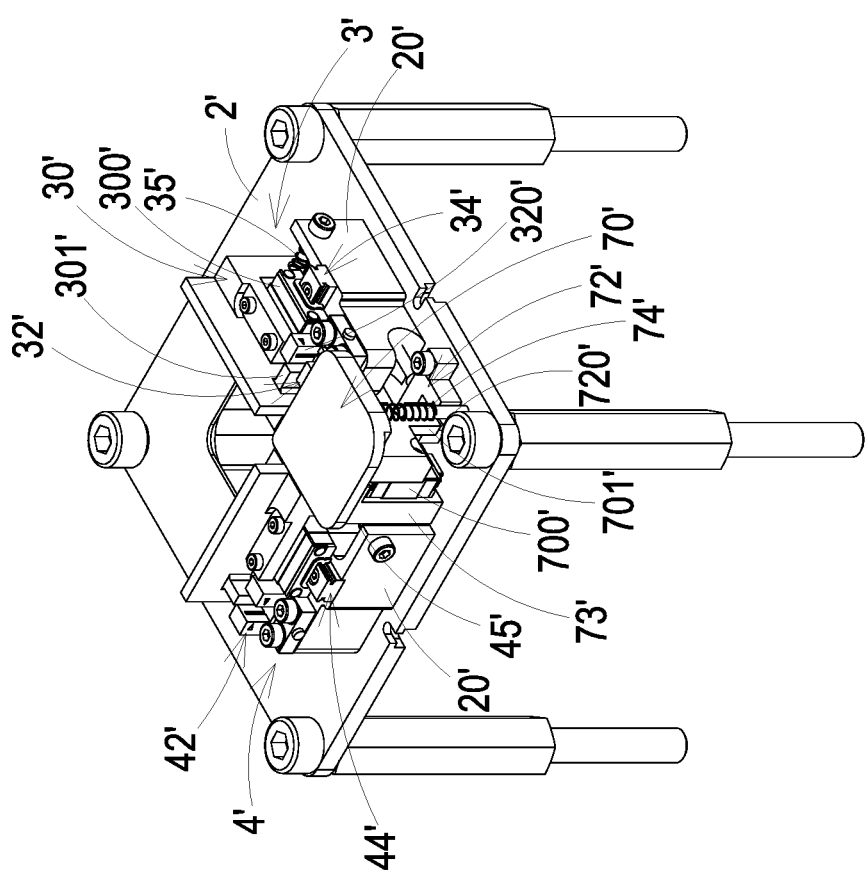
FIG. 8 is a schematic perspective view illustrating the tool calibration apparatus of FIG. 7 and taken along another viewpoint.
Figure 9:
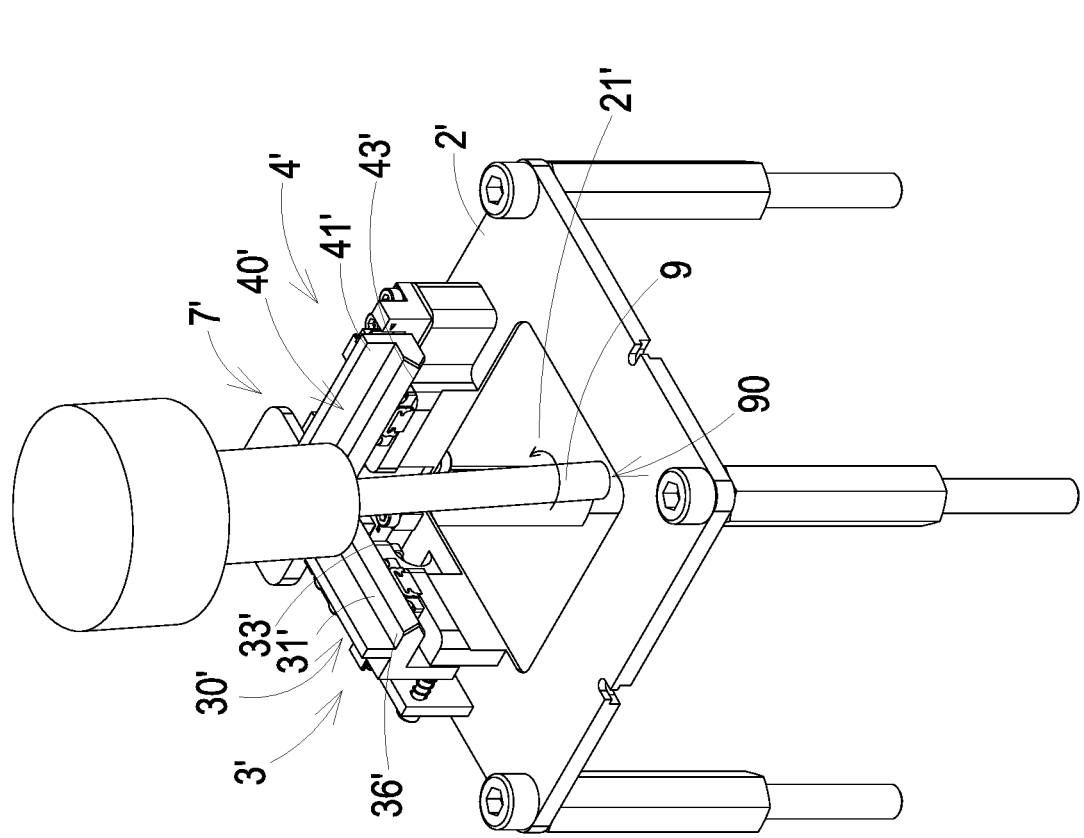
FIG. 9 is a schematic perspective view illustrating the application of the tool calibration apparatus of FIG. 7 on a tool.

Please refer to FIGS. 7, 8 and 9. FIG. 7 is a schematic perspective view illustrating a tool calibration apparatus according to a third embodiment of the present disclosure. FIG. 8 is a schematic perspective view illustrating the tool calibration apparatus of FIG. 7 and taken along another viewpoint. FIG. 9 is a schematic perspective view illustrating the application of the tool calibration apparatus of FIG. 7 on a tool. The tool calibration apparatus 1' is used for calibrating a tool 9, which is installed on an end of a robotic arm (see FIG. 1). Consequently, when the robotic arm 8 executes a required task, the tool 9 can be operated at the accurate position. The actions of the robotic arm 8 are controlled by a controller (see FIG. 1). Moreover, the controller can record the moved position point of the robotic arm 8. Moreover, the controller is in communication with the tool calibration apparatus 1' in a wired transmission manner or a wireless transmission manner.

The tool calibration apparatus 1' comprises a base 2', a first measuring device 3', a second measuring device 4' and a third measuring device 7'. The base 2' comprises plural pushing parts 20'. The pushing parts 20' are protruded upwardly from a top surface of the base 2'. As shown in FIG. 8, the base 2' comprises two pushing parts 20'. The two pushing parts 20' are arranged near the first measuring device 3' and the second measuring device 4', respectively. The first measuring device 3', the second measuring device 4' and the third measuring device 7' are disposed on the base 2'. In addition, the first measuring device 3' and the second measuring device 4' are arranged beside each other.

The first measuring device 3' comprises a first main body 30', a first measuring surface 31', a first sensor 32', a first measuring edge 33', a first linear track 34' and a first elastic element 35'. The first sensor 32' and the first elastic element 35' are arranged near two opposite sides of the first linear track 34'. The first sensor 32' is in communication with the controller in the wired transmission manner or the wireless transmission manner. When the first sensor 32' is triggered, a first feedback signal is transmitted from the first sensor 32' to the controller. According to the first feedback signal, the controller records the current position point of the robotic arm. The first main body 30' is movable in the X-axis direction. The first main body 30' comprises a sliding part 300' and a measuring part 301'. The measuring part 301' is aligned with the first sensor 32'. While the first measuring surface 31' drives the movement of the first main body 30' in the X-axis direction, the measuring part 301' is correspondingly moved in the X-axis direction. When the measuring part 301' is moved to the position of the first sensor 32', the first sensor 32' is triggered by the measuring part 301'. Consequently, the controller records the current position point of the robotic arm (i.e., a first current position point). While the first measuring edge 33' drives the movement of the first main body 30' in the X-axis direction, the measuring part 301' is correspondingly moved in the X-axis direction. When the measuring part 301' is moved to the position of the first sensor 32', the first sensor 32' is triggered by the measuring part 301'. Consequently, the controller records the current position point of the robotic arm (i.e., a second current position point). The first sensor 32' comprises a sensing recess 320' corresponding to the measuring part 301'. When the measuring part 301' is moved to the sensing recess 320', the first sensor 32' is triggered. Preferably but not exclusively, the first sensor 32' is a position sensor or a contact switch. The first linear track 34' is fixed on the corresponding pushing part 20' of the base 2'. Moreover, the sliding part 300' matches the first linear track 34'. Consequently, the first main body 30' can be slid relative to the first linear track 34'. The first measuring surface 31' is perpendicularly protruded from a top surface of the first main body 30'. Moreover, the first main body 30' is moved with the first measuring surface 31' in the X-axis direction. The first measuring edge 33' is a shape edge of a sharp-shaped block 36' of the first main body 30'. The sharp-shaped block 36' is horizontally protruded from the first main body 30' and tapered in the direction toward the second measuring device 4'. Consequently, the shape edge of the sharp-shaped block 36' is created. Moreover, the first main body 30' is moved with the first measuring edge 33' in the X-axis direction. The first elastic element 35' is arranged between the first main body 30' and the corresponding pushing part 20'. A first end of the first elastic element 35' is contacted with the corresponding pushing part 20'. A second end of the first elastic element 35' is contacted with the first main body 30'. When an external force from the first main body 30' is exerted on the first elastic element 35', the first elastic element 35' is compressed to generate an elastic restoring force. When the external force is no longer exerted on the first elastic element 35', the first main body 30' is returned to its original position in response to the elastic restoring force of the first elastic element 35'.

The second measuring device 4' comprises a second main body 40', a second measuring surface 41', a second sensor 42', a second measuring edge 43', a second linear track 44' and a second elastic element 45'. The structures, constituents and actions of the second main body 40', the second measuring surface 41', the second sensor 42', the second measuring edge 43', the second linear track 44' and the second elastic element 45' are similar to the first main body 30', the first measuring surface 31', the first sensor 32', the first measuring edge 33', the first linear track 34' and the first elastic element 35' of the first measuring device 3', and are not redundantly described herein. Whereas, the second main body 40' of the second measuring device 4' is movable in the Y-axis direction. Consequently, the second measuring surface 41' and the second measuring edge 43' are moved with the second main body 40' in the Y-axis direction. While the second measuring surface 41' drives the movement of the second main body 40' to trigger the second sensor 42', a second feedback signal is transmitted from the second sensor 42' to the controller. According to the second feedback signal, the controller records the current position point of the robotic arm (i.e., a third current position point). While the second measuring edge 43' drives the movement of the second main body 40' to trigger the second sensor 42', the second feedback signal is also transmitted from the second sensor 42' to the controller. According to the second feedback signal, the controller also records the current position point of the robotic arm (i.e., a fourth current position point).

The third measuring device 7' comprises a third main body 70', a third measuring surface 71', a third sensor 72', a third linear track 73' and a third elastic element 74'. The third sensor 72' is in communication with the controller in the wired transmission manner or the wireless transmission manner. When the third sensor 72' is triggered, a third feedback signal is transmitted from the third sensor 72' to the controller. According to the third feedback signal, the controller records the current position point of the robotic arm. The third main body 70' is movable in the Z-axis direction. The third main body 70' comprises a sliding part 700' and a measuring part 701'. The measuring part 701' is aligned with the third sensor 72'. While the third measuring surface 71' drives the movement of the third main body 70' in the Z-axis direction, the measuring part 701' is correspondingly moved in the Z-axis direction. When the measuring part 701' is moved to the position of the third sensor 72', the third sensor 72' is triggered by the measuring part 701. Consequently, the controller records the current position point of the robotic arm (i.e., a fifth current position point). The third sensor 72' comprises a sensing recess 720' corresponding to the measuring part 701'. When the measuring part 701' is moved to the sensing recess 720', the third sensor 72' is triggered. Preferably but not exclusively, the third sensor 72' is a position sensor. The third linear track 73' is fixed on the top surface of the base 2'. Moreover, the sliding part 700' matches the third linear track 73'. Consequently, the third main body 70' can be slid relative to the third linear track 73'. The third measuring surface 71' is horizontally protruded from a top surface of the third main body 70'. Moreover, the third main body 70' is moved with the third measuring surface 71' in the Z-axis direction. The third elastic element 74' is arranged between the third main body 70' and the base 2'. A first end of the third elastic element 74' is contacted with the base 2'. A second end of the third elastic element 74' is contacted with the third main body 70'. When an external force from the third main body 70' is exerted on the third elastic element 74', the third elastic element 74' is compressed to generate an elastic restoring force. When the external force is no longer exerted on the third elastic element 74', the third main body 70' is returned to its original position in response to the elastic restoring force of the third elastic element 74'.

The tool 9 comprises a TCP 90 (i.e., a distal end). When the robotic arm drives movement of the tool 9 relative to the base 2', the TCP 90 of the tool 9 is contacted with the first measuring surface 31' or the second measuring surface 41'. Consequently, the first measuring surface 31' or the second measuring surface 41' is correspondingly moved. When the TCP 90 of the tool 9 is contacted with the third measuring surface 71', the third measuring surface 71' is correspondingly moved. Moreover, when the robotic arm 8 drives the movement of the tool 9 relative to the base 2', the outer surface of a cross section of the tool 9 may be contacted with the first measuring edge 33' and the second measuring edge 43'. Consequently, the first measuring edge 33' and the second measuring edge 43' are correspondingly moved.

As shown in FIGS. 7 and 8, the base 2' further comprises a hollow portion 21'. While the robotic arm drives the movement of the tool 9 relative to the base 2' to adjust the measuring altitude of the tool 9, the tool 9 can be inserted into the hollow portion 21'. Since the measuring altitude of the tool 9 can be adjusted freely, the movement of the tool 9 is not limited by the base 2'.

Hereinafter, the use of the tool calibration apparatus 1' to calibrate the TCP of the tool 9, calibrate the axis direction of the tool 9 and calibrate the dimension of the tool 9 will be described sequentially. In an embodiment, the tool 9 is an asymmetric-type tool. First of all, the TCP calibration of the tool 9 is performed by the tool calibration apparatus 1'. For example, the movement in the X-axis direction is sensed. While the robotic arm drives the movement of the tool 9 in the X-axis direction, the TCP 90 of the tool 9 is moved from an initial position to the first measuring surface 31'. When the TCP 90 of the tool 9 is contacted with the first measuring surface 31', the first measuring surface 31' is pushed to be slid along the first linear track 34'. As the first measuring surface 31' is moved, the first main body 30' is correspondingly moved to provide an external force to the first elastic element 35'. Consequently, the first elastic element 35' is compressed to generate an elastic restoring force. As the first measuring surface 31' is moved, the measuring part 301' of the first main body 30' is moved into the sensing recess 320' of the first sensor 32'. Consequently, the first sensor 32' is triggered by the measuring part 301', and the controller records the current position point of the robotic arm 8 (i.e., a first current position point). Then, the robotic arm drives the movement of the tool 9 in the direction reverse to the X-axis direction. In response to the elastic restoring force of the first elastic element 35', the first measuring surface 31' is returned to the initial position.

The way of sensing the movement in the Y-axis direction is similar to the way of sensing the movement in the X-axis direction. While the robotic arm drives the movement of the tool 9 in the Y-axis direction, the TCP 90 of the tool 9 is moved from an initial position to the second measuring surface 41'. When the TCP 90 of the tool 9 is contacted with the second measuring surface 41', the second measuring surface 41' is pushed to be slid along the second linear track 44'. As the second measuring surface 41' is moved, the second main body 40' is correspondingly moved to provide an external force to the second elastic element 45'. Consequently, the second elastic element 45' is compressed to generate an elastic restoring force. As the second measuring surface 41' is moved, the measuring part of the second main body 40' is moved into the sensing recess of the second sensor 42'. Consequently, the second sensor 42' is triggered, and the controller records the current position point of the robotic arm (i.e., a third current position point). Then, the robotic arm drives the movement of the tool 9 in the direction reverse to the Y-axis direction. In response to the elastic restoring force of the second elastic element 45', the second measuring surface 41' is returned to the initial position.

The way of sensing the movement in the Z-axis direction is similar to the way of sensing the movement in the X-axis direction. While the robotic arm drives the movement of the tool 9 in the Z-axis direction, the TCP 90 of the tool 9 is moved from an initial position to the third measuring surface 71'. When the TCP 90 of the tool 9 is contacted with the third measuring surface 71', the third measuring surface 71' is pushed to be slid along the third linear track 73'. As the third measuring surface 71' is moved, the third main body 70' is correspondingly moved to provide an external force to the third elastic element 74'. Consequently, the third elastic element 74' is compressed to generate an elastic restoring force. As the third measuring surface 71' is moved, the measuring part 701 of the third main body 70' is moved into the sensing recess 720' of the third sensor 72'. Consequently, the third sensor 72' is triggered, and the controller records the current position point of the robotic arm (i.e., a fifth current position point). Then, the robotic arm drives the movement of the tool 9 in the direction reverse to the Z-axis direction. In response to the elastic restoring force of the third elastic element 74', the third measuring surface 71' is returned to the initial position.

After the movements in the X-axis direction, the Y-axis direction and the Z-axis direction are sensed, the controller records the first current position point, the third current position point and the fifth current position point. The first current position point is obtained when the TCP 90 of the tool 9 pushes the first measuring surface 31' to trigger the first sensor 32'. The third current position point is obtained when the TCP 90 of the tool 9 pushes the second measuring surface 41' to trigger the second sensor 42'. The fifth current position point is obtained when the TCP 90 of the tool 9 pushes the third measuring surface 71' to trigger the third sensor 72'. In other words, the first current position point, the third current position point and the fifth current position point are related to the position of the TCP 90 of the tool 9. Consequently, the relationship between the TCP 90 of the tool 9 and the end-effect position point of the robotic arm is acquired and the TCP calibration of the tool 9 is accomplished.

The use of the tool calibration apparatus 1' to calibrate the axis direction of the tool 9 will be described as follows.

Firstly, the robotic arm drives movement of the tool 9 in a first measuring altitude. In addition, the tool 9 is moved from an initial position to the first measuring edge 33' and the second measuring edge 43'. When a first contact point and a second contact point of a first cross section of the tool 9 are contacted with the first measuring edge 33' and the second measuring edge 43', the first measuring edge 33' and the second measuring edge 43' are slid along the first linear track 34' and the second linear track 44' to trigger the first sensor 32' and the second sensor 42' respectively. Meanwhile, the controller records plural current position points of the robotic arm corresponding to the first measuring altitude of the tool. That is, the current position point corresponding to the first sensor 32' (i.e., the second current position point) and the current position point corresponding to the second sensor 42' (i.e., the fourth current position point) are recorded. Then, the robotic arm drives the movement of the tool 9 to the initial position, and thus the tool 9 is not contacted with any measuring edge. In response to the elastic restoring forces of the first elastic element 35' and the second elastic element 45', the first measuring edge 33' and the second measuring edge 43' are returned to the initial positions.

Then, the robotic arm drives rotation of the tool 9 at 90 degrees. For example, the tool 9 is rotated 90 degrees in a counterclockwise direction or a clockwise direction. As shown in FIG. 9, the tool 9 is rotated 90 degrees in the counterclockwise direction. Then, the robotic arm also drives movement of the tool 9 in the first measuring altitude. In addition, the tool 9 is moved from an initial position to the first measuring edge 33' and the second measuring edge 43'. When a third contact point and a fourth contact point of the first cross section of the tool 9 are contacted with the first measuring edge 33' and the second measuring edge 43', the first measuring edge 33' and the second measuring edge 43' are slid along the first linear track 34' and the second linear track 44' to trigger the first sensor 32' and the second sensor 42' respectively. Meanwhile, the controller records plural current position points of the robotic arm corresponding to the first measuring altitude of the tool. That is, the current position point corresponding to the first sensor 32' (i.e., another second current position point) and the current position point corresponding to the second sensor 42' (i.e., another fourth current position point) are recorded. Then, the robotic arm drives the movement of the tool 9 to the initial position, and thus the tool 9 is not contacted with any measuring edge. In response to the elastic restoring forces of the first elastic element 35' and the second elastic element 45', the first measuring edge 33' and the second measuring edge 43' are returned to the initial positions. According to the two second current position points and the two fourth current position points corresponding to the first measuring attitude of the tool 9, the axis center position of the first cross section of the tool 9 is deduced.

Then, the robotic arm adjusts the tool 9 to a second measuring altitude, which is different from the first measuring attitude. In addition, the tool 9 is moved from an initial position to the first measuring edge 33' and the second measuring edge 43'. When a fifth contact point and a sixth contact point of a second cross section of the tool 9 are contacted with the first measuring edge 33' and the second measuring edge 43', the first measuring edge 33' and the second measuring edge 43' are slid along the first linear track 34' and the second linear track 44' to trigger the first sensor 32' and the second sensor 42' respectively. Meanwhile, the controller records plural current position points of the robotic arm corresponding to the second measuring altitude of the tool 9. That is, the current position point corresponding to the first sensor 32' (i.e., the second current position point) and the current position point corresponding to the second sensor 42' (i.e., the fourth current position point) are recorded. Then, the robotic arm drives the movement of the tool 9 to the initial position, and thus the tool 9 is not contacted with any measuring edge. In response to the elastic restoring forces of the first elastic element 35' and the second elastic element 45', the first measuring edge 33' and the second measuring edge 43' are returned to the initial positions.

Then, the robotic arm drives rotation of the tool 9 at 90 degrees. For example, the tool 9 is rotated 90 degrees in a counterclockwise direction or a clockwise direction. Then, the robotic arm also drives movement of the tool 9 in the second measuring altitude. In addition, the tool 9 is moved from an initial position to the first measuring edge 33' and the second measuring edge 43'. When a seventh contact point and an eighth contact point of the second cross section of the tool 9 are contacted with the first measuring edge 33' and the second measuring edge 43', the first measuring edge 33' and the second measuring edge 43' are slid along the first linear track 34' and the second linear track 44' to trigger the first sensor 32' and the second sensor 42' respectively. Meanwhile, the controller records plural current position points of the robotic arm corresponding to the second measuring altitude of the tool 9. That is, the current position point corresponding to the first sensor 32' (i.e., another second current position point) and the current position point corresponding to the second sensor 42' (i.e., another fourth current position point) are recorded. Then, the robotic arm drives the movement of the tool 9 to the initial position, and thus the tool 9 is not contacted with any measuring edge. In response to the elastic restoring forces of the first elastic element 35' and the second elastic element 45', the first measuring edge 33' and the second measuring edge 43' are returned to the initial positions. The fifth contact point and the seventh contact point are symmetric with respect to the axis line of the tool 9, and the sixth contact point and the eighth contact point are symmetric with respect to the axis line of the tool 9. According to the two second current position points and the two fourth current position points corresponding to the second measuring attitude of the tool 9, the axis center position of the second cross section of the tool 9 is deduced.

According to the axis center position of the first cross section of the tool 9, the axis center position of the second cross section of the tool 9 and the known height difference between the first measuring altitude and the second measuring attitude, the axis direction information of the tool 9 is obtained.

In another embodiment, the tool 9 is a symmetric-type tool. Under this circumstance, the controller only needs to record one second current position point and one fourth current position point corresponding to the first measuring attitude and one second current position point and one fourth current position point corresponding to the second measuring attitude. In other words, it is not necessary to rotate the tool 9 at 90 degrees when the tool 9 is in each measuring altitude.

The use of the tool calibration apparatus 1' to calibrate the dimension of the tool 9 will be described as follows.

After the axis direction information of the tool 9 is obtained, the robotic arm adjusts the axis direction of the tool 9 to be perpendicular to the base 2 (i.e., perpendicular to the XY plane). Then, the robotic arm adjusts the tool 9 to a third measuring altitude. The tool 9 is moved in the third measuring altitude. In addition, the tool 9 is moved from an initial position to the first measuring edge 33' and the second measuring edge 43' sequentially. When a ninth contact point and a tenth contact point of a third cross section of the tool 9 are respectively contacted with the first measuring edge 33' and the second measuring edge 43', the first measuring edge 33' and the second measuring edge 43' are respectively slid along the first linear track 34' and the second linear track 44'. Consequently, the first sensor 32' and the second sensor 42' are sequentially triggered. Meanwhile, the controller records plural current position points of the robotic arm corresponding to the third measuring altitude of the tool 9. That is, the current position point corresponding to the first sensor 32' (i.e., the second current position point) and the current position point corresponding to the second sensor 42' (i.e., the fourth current position point) are recorded. Then, the robotic arm drives the movement of the tool 9 such that the tool 9 is not contacted with any measuring edge. In response to the elastic restoring forces of the first elastic element 35' and the second elastic element 45', the first measuring edge 33' and the second measuring edge 43' are returned to the initial positions.

Then, the robotic arm drives rotation of the tool 9 at 90 degrees. The robotic arm also drives movement of the tool 9 in the third measuring altitude. In addition, the tool 9 is moved from an initial position to the first measuring edge 33' and the second measuring edge 43'. When an eleventh contact point and a twelfth contact point of the third cross section of the tool 9 are contacted with the first measuring edge 33' and the second measuring edge 43', the first measuring edge 33' and the second measuring edge 43' are slid along the first linear track 34' and the second linear track 44' to trigger the first sensor 32' and the second sensor 42' respectively. Meanwhile, the controller records plural current position points of the robotic arm corresponding to the third measuring altitude of the tool 9. That is, the current position point corresponding to the first sensor 32' (i.e., another second current position point) and the current position point corresponding to the second sensor 42' (i.e., another fourth current position point) are recorded. Then, the robotic arm drives the movement of the tool 9 to the initial position, and thus the tool 9 is not contacted with any measuring edge. In response to the elastic restoring forces of the first elastic element 35' and the second elastic element 45', the first measuring edge 33' and the second measuring edge 43' are returned to the initial positions. The ninth contact point and the eleventh contact point are symmetric with respect to the axis line of the tool 9, and the tenth contact point and the twelfth contact point are symmetric with respect to the axis line of the tool 9.

Then, the robotic arm adjusts the tool 9 to a fourth measuring altitude, which is different from the third measuring attitude. The tool 9 is moved in the fourth measuring altitude. In addition, the tool 9 is moved from an initial position to the first measuring edge 33' and the second measuring edge 43'. When a thirteenth contact point and a fourteenth contact point of the fourth cross section of the tool 9 are contacted with the first measuring edge 33' and the second measuring edge 43', the first measuring edge 33' and the second measuring edge 43' are slid along the first linear track 34' and the second linear track 44' to trigger the first sensor 32' and the second sensor 42' respectively. Meanwhile, the controller records plural current position points of the robotic arm corresponding to the fourth measuring altitude of the tool 9. That is, the current position point corresponding to the first sensor 32' (i.e., another second current position point) and the current position point corresponding to the second sensor 42' (i.e., another fourth current position point) are recorded. Then, the robotic arm drives the movement of the tool 9 to the initial position, and thus the tool 9 is not contacted with any measuring edge. In response to the elastic restoring forces of the first elastic element 35' and the second elastic element 45', the first measuring edge 33' and the second measuring edge 43' are returned to the initial positions.

Then, the robotic arm drives rotation of the tool 9 at 90 degrees. The robotic arm also drives movement of the tool 9 in the fourth measuring altitude. In addition, the tool 9 is moved from an initial position to the first measuring edge 33' and the second measuring edge 43'. When a fifteenth contact point and a sixteenth contact point of the fourth cross section of the tool 9 are contacted with the first measuring edge 33' and the second measuring edge 43', the first measuring edge 33' and the second measuring edge 43' are slid along the first linear track 34' and the second linear track 44' to trigger the first sensor 32' and the second sensor 42' respectively. Meanwhile, the controller records plural current position points of the robotic arm corresponding to the fourth measuring altitude of the tool 9. That is, the current position point corresponding to the first sensor 32' (i.e., another second current position point) and the current position point corresponding to the second sensor 42' (i.e., another fourth current position point) are recorded. Then, the robotic arm drives the movement of the tool 9 to the initial position, and thus the tool 9 is not contacted with any measuring edge. In response to the elastic restoring forces of the first elastic element 35' and the second elastic element 45', the first measuring edge 33' and the second measuring edge 43' are returned to the initial positions. The thirteenth contact point and the fifteenth contact point are symmetric with respect to the axis line of the tool 9, and the fourteenth contact point and the sixteenth contact point are symmetric with respect to the axis line of the tool 9.

According to the two second current position points and the two fourth current position points corresponding to the third measuring attitude of the tool 9 and the two second current position points and the two fourth current position points corresponding to the fourth measuring attitude of the tool 9, the dimension of the tool 9 is obtained.

From the above descriptions, the present disclosure provides a tool calibration apparatus for a robotic arm. Since the tool calibration apparatus is not equipped with the infrared sensor, the fabricating cost is reduced. In addition, the tool calibration apparatus can be modularized. By moving the measuring surfaces of three measuring devices to trigger the corresponding sensors, the controller records plural current position points of the robotic arm. Consequently, the relative offset between the TCP of the tool and the end-effect position point of the robotic arm can be accurately measured and acquired. Moreover, by contacting the tool with the measuring edges of the two measuring devices, the controller records plural current position points of the robotic arm. According to the plural current position points, the axis direction information of the tool in the initial state, the dimension of the tool and the rotation angle of the tool are obtained. Consequently, the robotic arm can quickly and precisely compensate the accuracy of the tool. In other words, the tool can be accurately operated. In comparison with the manual calibration method, the tool calibration apparatus of the present disclosure is time-saving while achieving high precise calibration and increasing the applications.

What is claimed is:

1. A tool calibration apparatus for a robotic arm with a tool, the robotic arm being controlled by a controller, the controller recording a position point of the robotic arm and being in communication with the tool calibration apparatus, the tool calibration apparatus comprising:

a base;

a first measuring device disposed on the base, and comprising a first measuring surface, a first sensor and a first measuring edge, wherein the first measuring surface and the first measuring edge are movable in an X-axis direction, wherein when a tool center point of the tool is contacted with the first measuring surface to drive a movement of the first measuring surface and trigger the first sensor, the first sensor generates a first feedback signal to the controller, and the controller records the position point of the robotic arm according to the first feedback signal, wherein when any region of the tool is contacted with the first measuring edge to drive a movement of the first measuring edge and trigger the first sensor, the first sensor generates the first feedback signal to the controller, and the controller records the position point of the robotic arm according to the first feedback signal;

a second measuring device disposed on the base, and comprising a second measuring surface, a second sensor and a second measuring edge, wherein the second measuring surface and the second measuring edge are movable in a Y-axis direction, wherein when the tool center point of the tool is contacted with the second measuring surface to drive a movement of the second measuring surface and trigger the second sensor, the second sensor generates a second feedback signal to the controller, and the controller records the position point of the robotic arm according to the second feedback signal, wherein when any region of the tool is contacted with the second measuring edge to drive a movement of the second measuring edge and trigger the second sensor, the second sensor generates the second feedback signal to the controller, and the controller records the position point of the robotic arm according to the second feedback signal;

a third measuring device disposed on the base and opposed to the first measuring device, and comprising a third sensor and a third measuring edge, wherein the third measuring edge is movable in the X-axis direction, wherein when any region of the tool is contacted with the third measuring edge to drive a movement of the third measuring edge and trigger the third sensor, the third sensor generates a third feedback signal to the controller, and the controller records the position point of the robotic arm according to the third feedback signal;

a fourth measuring device disposed on the base and opposed to the second measuring device, and comprising a fourth sensor and a fourth measuring edge, wherein the fourth measuring edge is movable in the Y-axis direction, wherein when any region of the tool is contacted with the fourth measuring edge to drive a movement of the fourth measuring edge and trigger the fourth sensor, the fourth sensor generates a fourth feedback signal to the controller, and the controller records the position point of the robotic arm according to the fourth feedback signal; and a fifth measuring device disposed on the base, and comprising a fifth sensor and a third measuring surface, wherein the third measuring surface is movable in a Z-axis direction, wherein when the tool center point of the tool is contacted with the third measuring surface to drive a movement of the third measuring surface and trigger the fifth sensor, the fifth sensor generates a fifth feedback signal to the controller, and the controller records the position point of the robotic arm according to the fifth feedback signal, wherein the tool drives at least one of the first measuring device, the second measuring device, the third measuring device, the fourth measuring device and the fifth measuring device to generate at least one of the first feedback signal, the second feedback signal, the third feedback signal, the fourth feedback signal and the fifth feedback signal to the controller, so that a required information of the tool is acquired according the position point of robotic arm recorded by the controller.

2. The tool calibration apparatus according to claim 1, wherein the first measuring device, the second measuring device, the third measuring device and the fourth measuring device are disposed on the base in a rectangular arrangement, a sensing space is formed in the base and arranged between the first measuring device, the second measuring device, the third measuring device and the fourth measuring device, and the tool is movable within the sensing space.

3. The tool calibration apparatus according to claim 2, wherein the base further comprises a hollow portion corresponding to the sensing space, wherein when a measuring altitude of the tool within the sensing space is adjusted, the tool is inserted into the hollow portion.

4. The tool calibration apparatus according to claim 2, wherein the first measuring device further comprises a main body and a sharp-shaped block, wherein the first measuring surface is perpendicularly protruded from a top surface of the main body, and the sharp-shaped block is horizontally protruded from the main body and tapered in a direction toward the sensing space, so that a shape edge of the sharp-shaped block is formed as the first measuring edge.

5. The tool calibration apparatus according to claim 4, wherein the first measuring device further comprises a linear track and an elastic element, wherein when the main body is slid relative to the linear track, the first measuring surface or the first measuring edge is correspondingly moved and the elastic element is compressed to generate an elastic restoring force.

6. The tool calibration apparatus according to claim 5, wherein the first measuring device and the second measuring device have the same structure.

7. The tool calibration apparatus according to claim 2, wherein the third measuring device further comprises a main body and a sharp-shaped block, wherein the sharp-shaped block is horizontally protruded from the main body and tapered in a direction toward the sensing space, so that a shape edge of the sharp-shaped block is formed as the third measuring edge.

8. The tool calibration apparatus according to claim 7, wherein the third measuring device and the fourth measuring device have the same structure.

9. The tool calibration apparatus according to claim 2, wherein the fifth measuring device is located over the base and located outside the sensing space, wherein the fifth measuring device comprises a main body, and the third measuring surface is horizontally protruded from a top surface of the main body.

10. The tool calibration apparatus according to claim 1, further comprising:
a sixth measuring device disposed on the base, arranged near and aligned with the first measuring device, and comprising a sixth sensor and a sixth measuring edge, wherein the sixth measuring edge of the sixth measuring device is movable in the X-axis direction, wherein when any region of the tool is contacted with the sixth measuring edge of the sixth measuring device to drive a movement of the sixth measuring edge of the sixth measuring device and trigger the sixth sensor of the sixth measuring device, the sixth sensor of the sixth measuring device generates a sixth feedback signal to the controller, and the controller records the position point of the robotic arm according to the sixth feedback signal;
a seventh measuring device disposed on the base, arranged near and aligned with the second measuring device, and comprising a seventh sensor and a seventh measuring edge, wherein the seventh measuring edge of the seventh measuring device is movable in the Y-axis direction, wherein when any region of the tool is contacted with the seventh measuring edge of the seventh measuring device to drive a movement of the seventh measuring edge of the seventh measuring device and trigger the seventh sensor of the seventh measuring device, the seventh sensor of the seventh measuring device generates a seventh feedback signal to the controller, and the controller records the position point of the robotic arm according to the seventh feedback signal;
an eighth measuring device disposed on the base, arranged near and aligned with the third measuring device, and comprising an eighth sensor and an eighth measuring edge, wherein the eighth measuring edge of the eighth measuring device is movable in the X-axis direction, wherein when any region of the tool is contacted with the eighth measuring edge of the eighth measuring device to drive a movement of the eighth measuring edge of the eighth measuring device and trigger the eighth sensor of the eighth measuring device, the eighth sensor of the eighth measuring device generates an eighth feedback signal to the controller, and the controller records the position point of the robotic arm according to the eighth feedback signal; and
a ninth measuring device disposed on the base, arranged near and aligned with the fourth measuring device, and comprising a ninth sensor and a ninth measuring edge, wherein the ninth measuring edge of the ninth measuring device is movable in the Y-axis direction, wherein when any region of the tool is contacted with the ninth measuring edge of the ninth measuring device to drive a movement of the ninth measuring edge of the ninth measuring device and trigger the ninth sensor of the ninth measuring device, the ninth sensor of the ninth measuring device generates a ninth feedback signal to the controller, and the controller records the position point of the robotic arm according to the ninth feedback signal.

11. The tool calibration apparatus according to claim 10, wherein the sixth measuring edge of the sixth measuring device is located under the first measuring edge of the first measuring device and is in parallel with and corresponding in position to the first measuring edge of the first measuring device, wherein the seventh measuring edge of the seventh measuring device is located under the second measuring edge of the second measuring device and is in parallel with and corresponding in position to the second measuring edge of the second measuring device, wherein the eighth measuring edge of the eighth measuring device is located under the third measuring edge of the third measuring device and is in parallel with and corresponding in position to the third measuring edge of the third measuring device, wherein the ninth measuring edge of the ninth measuring device is located under the fourth measuring edge of the fourth measuring device and is in parallel with and corresponding in position to the fourth measuring edge of the fourth measuring device.

12. The tool calibration apparatus according to claim 11, wherein a distance between the sixth measuring edge of the sixth measuring device and the first measuring edge of the first measuring device, a distance between the seventh measuring edge of the seventh measuring device and the second measuring edge of the second measuring device, a distance between the eighth measuring edge of the eighth measuring device and the third measuring edge of the third measuring device and a distance between the ninth measuring edge of the ninth measuring device and the fourth measuring edge of the fourth measuring device are equal.

13. A tool calibration apparatus for a robotic arm with a tool, the robotic arm being controlled by a controller, the controller recording a position point of the robotic arm and being in communication with the tool calibration apparatus, the tool calibration apparatus comprising:
a base;
a first measuring device disposed on the base, and comprising a first measuring surface, a first sensor and a first measuring edge, wherein the first measuring surface and the first measuring edge are movable in an X-axis direction, wherein when a tool center point of the tool is contacted with the first measuring surface to drive a movement of the first measuring surface and trigger the first sensor, the first sensor generates a first feedback signal to the controller, and the controller records the position point of the robotic arm according to the first feedback signal, wherein when any region of the tool is contacted with the first measuring edge to drive a movement of the first measuring edge and trigger the first sensor, the first sensor generates the first feedback signal to the controller, and the controller records the position point of the robotic arm according to the first feedback signal;
a second measuring device disposed on the base, and comprising a second measuring surface, a second sensor and a second measuring edge, wherein the second measuring surface and the second measuring edge are movable in a Y-axis direction, wherein when the tool center point of the tool is contacted with the second measuring surface to drive a movement of the second measuring surface and trigger the second sensor, the second sensor generates a second feedback signal to the controller, and the controller records the position point of the robotic arm according to the second feedback signal, wherein when any region of the tool is contacted with the second measuring edge to drive a movement of the second measuring edge and trigger the second sensor, the second sensor generates the second feedback signal to the controller, and the controller records the position point of the robotic arm according to the second feedback signal; and a third measuring device disposed on the base, and comprising a third sensor and a third measuring surface, wherein the third measuring surface is movable in a Z-axis direction, wherein when the tool center point of the tool is contacted with the third measuring surface to drive a movement of the third measuring surface and trigger the third sensor, the third sensor generates a third feedback signal to the controller, and the controller records the position point of the robotic arm according to the third feedback signal, wherein the tool drives at least one of the first measuring device, the second measuring device and the third measuring device to generate at least one of the first feedback signal, the second feedback signal and the third feedback signal to the controller, so that a required information of the tool is acquired according the position point of robotic arm recorded by the controller.

14. The tool calibration apparatus according to claim 13, wherein the base further comprises a hollow portion, wherein when a measuring altitude of the tool relative to the base is adjusted, the tool is inserted into the hollow portion.

15. The tool calibration apparatus according to claim 13, wherein the first measuring device further comprises a main body and a sharp-shaped block, wherein the first measuring surface is perpendicularly protruded from a top surface of the main body, and the sharp-shaped block is horizontally protruded from the main body and tapered in a direction toward the second measuring device, so that a shape edge of the sharp-shaped block is formed as the first measuring edge.

16. The tool calibration apparatus according to claim 15, wherein the first measuring device and the second measuring device have the same structure.

* * * * *